(12) United States Patent
Zhu et al.

(10) Patent No.: US 10,006,166 B2
(45) Date of Patent: Jun. 26, 2018

(54) INTEGRATING THE PRODUCTION OF CARBOXYLATED CELLULOSE NANOFIBRILS AND CELLULOSE NANOCRYSTALS USING RECYCLABLE ORGANIC ACIDS

(71) Applicant: The United States of America as Represented by the Secretary of Agriculture, Washington, DC (US)

(72) Inventors: JunYong Zhu, Madison, WI (US); Liheng Chen, Madison, WI (US); Rolland Gleisner, Jefferson, WI (US)

( * ) Notice: Subject to any disclaimer, the term of this patent is extended or adjusted under 35 U.S.C. 154(b) by 53 days.

(21) Appl. No.: 15/017,229

(22) Filed: Feb. 5, 2016

(65) Prior Publication Data

US 2017/0226692 A1 Aug. 10, 2017

(51) Int. Cl.
| | | |
|---|---|---|
| *D21B 1/06* | (2006.01) | |
| *C08B 15/08* | (2006.01) | |
| *D21C 9/00* | (2006.01) | |
| *D21B 1/02* | (2006.01) | |

(52) U.S. Cl.
CPC .............. *D21B 1/021* (2013.01); *C08B 15/08* (2013.01); *D21B 1/06* (2013.01); *D21C 9/005* (2013.01); *D21C 9/007* (2013.01)

(58) Field of Classification Search
CPC . C08B 15/00; C08B 15/08; C08L 1/02; C08L 2205/16; D21C 9/007; D21C 9/005; D21H 11/18; D21B 1/021; D21B 1/06; B82Y 30/00; B82Y 40/00; A61K 31/717; A61K 8/027; A61L 2400/12; D06M 13/192; D06M 15/26
See application file for complete search history.

(56) References Cited

U.S. PATENT DOCUMENTS

| | | | |
|---|---|---|---|
| 2,778,751 A | 1/1957 | Riehm | |
| 4,266,981 A | 5/1981 | Tsao | |
| 5,188,673 A | 2/1993 | Clausen | |
| 5,346,589 A | 9/1994 | Braunstein | |
| 5,562,777 A | 10/1996 | Farone | |
| 5,597,714 A | 1/1997 | Farone | |
| 6,231,657 B1* | 5/2001 | Cantiani | A61K 8/027 106/162.8 |
| 6,875,274 B2 | 4/2005 | Wong | |
| 7,189,455 B2 | 3/2007 | Wong | |
| 7,306,698 B2 | 12/2007 | Swaney | |
| 7,780,875 B2 | 8/2010 | Asgari | |
| 8,092,647 B2 | 1/2012 | Akhtar | |
| 8,123,904 B2 | 2/2012 | Akhtar | |
| 8,592,511 B2 | 11/2013 | Gonen | |
| 8,593,052 B1 | 11/2013 | Yen | |
| 8,641,863 B2* | 2/2014 | Weerawarna | D21C 9/10 162/9 |
| 8,709,203 B2 | 4/2014 | Jemaa | |
| 8,710,213 B2* | 4/2014 | Zhu | C08B 5/00 536/56 |
| 8,829,110 B2 | 9/2014 | Hamad | |
| 8,900,706 B2 | 12/2014 | Leung | |
| 9,322,134 B2* | 4/2016 | Nelson | C08B 15/08 |
| 9,499,637 B2* | 11/2016 | Retsina | C08B 15/00 |
| 2003/0037891 A1* | 2/2003 | Jewell | D06M 13/192 162/9 |
| 2005/0028953 A1* | 2/2005 | Severeid | D21C 9/002 162/57 |
| 2009/0282802 A1 | 11/2009 | Cooper | |
| 2010/0175691 A1 | 7/2010 | Combs | |
| 2011/0277947 A1 | 11/2011 | Hua | |
| 2013/0032059 A1 | 2/2013 | Trexler | |
| 2013/0303749 A1 | 11/2013 | Vehniaeinen | |
| 2013/0303750 A1* | 11/2013 | Zhu | C08B 5/00 536/59 |
| 2014/0058077 A1* | 2/2014 | Laukkanen | B82Y 30/00 536/56 |
| 2014/0154756 A1* | 6/2014 | Nelson | C08B 15/08 435/135 |
| 2014/0155301 A1 | 6/2014 | Nelson | |
| 2015/0184345 A1* | 7/2015 | Nelson | D21H 21/32 435/139 |
| 2015/0204017 A1* | 7/2015 | Nelson | C08B 15/08 435/99 |

(Continued)

FOREIGN PATENT DOCUMENTS

| | | | | |
|---|---|---|---|---|
| WO | WO 9802486 A1 * | 1/1998 | ............ | A61K 8/027 |
| WO | WO 2015200780 A1 * | 12/2015 | ............ | D21C 9/007 |

OTHER PUBLICATIONS

Peng et a., "Chemistry and Applications of Nanocrystalline Cellulose and its Derivatives: a Nanotechnology Perspective," 2011, The Canadian Journal of Chemical engineering, vol. 9999, pp. 1-16.*
Chen et al. "Highly thermal-stable and functional cellulose nanocrystals and nanofibrils produced using fully recyclable organic acids," 2016, Green Chemistry, vol. 18, pp. 3835-3843.*
Du et al., "Sustainable preparation and characterization of thermally stable and functional cellulose nanocrystals and nanofibrils via formic acid hydrolysis," 2017, Journal of Bioresources and Bioproducts, 2(1) pp. 10-15.*
Chen et al., "Tailoring the yield and characteristics of wood cellulose nanocrystals (CNC) using concentrated acid hydrolysis," 2015, Cellulose 22, pp. 1753-1762.*
Araki, J., Wada M., Kuga S., Okano T., "Flow Properties of Microcrystalline Cellulose Suspension Prepared by Acid Treatment of Native Cellulose," Colloids and Surfaces A: Physicochemical and Engineering Aspects, 1998, 142:75-82.

(Continued)

*Primary Examiner* — Jose A Fortuna

(57) ABSTRACT

Methods for integrating the production of carboxylated CNCs and carboxylated CNFs from cellulose are provided. Carboxylated CNCs, carboxylated cellulosic solid residues (CSRs) in the form of cellulose fibers (CF) and/or cellulose microfibrils (CMFs), and carboxylated CNFs fabricated using the methods are also provided. The methods are based on the acid hydrolysis of a cellulosic material using weak solid organic acids to produce carboxylated CNCs and CNFs with thermal stabilities that are higher than the thermal stabilities of the cellulosic materials from which they are derived.

14 Claims, 23 Drawing Sheets

(56) References Cited

U.S. PATENT DOCUMENTS

| | | | | |
|---|---|---|---|---|
| 2015/0368368 A1* | 12/2015 | Retsina | ........... | C08B 15/00 |
| | | | | 106/203.2 |
| 2016/0130368 A1* | 5/2016 | Varma | ........... | C08B 11/12 |
| | | | | 514/57 |
| 2016/0168343 A1* | 6/2016 | Retsina | ........... | D01C 1/00 |
| | | | | 106/163.01 |
| 2016/0237173 A1* | 8/2016 | Nelson | ........... | C08B 15/08 |
| 2017/0027168 A1* | 2/2017 | Heath | ........... | A01N 25/30 |
| 2017/0107666 A1* | 4/2017 | Kajanto | ........... | D21C 5/005 |
| 2017/0190800 A1* | 7/2017 | Retsina | ........... | C08B 15/02 |
| 2017/0210826 A1* | 7/2017 | Nelson | ........... | C08B 15/08 |
| 2017/0218567 A1* | 8/2017 | Kajanto | ........... | D06P 5/30 |
| 2017/0226399 A1* | 8/2017 | Shimaoka | ........... | C09K 8/10 |
| 2017/0226692 A1* | 8/2017 | Zhu | ........... | D21B 1/021 |

OTHER PUBLICATIONS

Battista O.A., "Hydrolysis and Crystallization of Cellulose," Industry and Engineering Chemistry, 1950, 42 (3):502-507.

Beck-Candanedo S., Roman M., Gray D.G., "Effect of Reaction Conditions on the Properties and Behavior of Wood Cellulose Nanocrystal Suspensions," Biomacromolecules, 2005, 6:1048-1054.

Bondeson D., A.J., Oksman K., "Optimization of the Isolation of Nanocrystals From Microcrystalline Cellulose by Acid Hydrolysis," Cellulose, 2006, 13:171-180.

Braconnot H., "Verwandlungen des Holzftoffs Mittelft Schwefel-Faure in Gummi," Zucker und eine eigne Saure, und mitten Kali in Ulmin, Ann Physik, 1819, 63:347-370.

Camarero Espinosa S., Kuhnt T., Foster E.J., Weder C., "Isolation of Thermally Stable Cellulose Nanocrystals by Phosphoric Acids Hydrolysis," Biomacromolecules, 2013, 14(4):1223-1230.

Chen L., Wang Q., Hirth K., Baez C., Agarwal U.P., Zhu J.Y., "Tailoring the Yield and Characteristics of Wood Cellulose Nanocrystals (CNC) Using Concentrated Acid Hydrolysis," Cellulose, 2015, 22:1753-1762.

Chen Y., Liu C., Chang P.R., Cao X., Anderson D.P., "Bionanocomposites Based on Pea Starch and Cellulose Nanowhiskers Hydrolyzed from Pea Hull Fibre: Effect of Hydrolysis Time," Carbohydrate Polymers, 2009, 76 (4):607-615.

Dong X.M., Gray D.G., "Induced Circular Dichroism of Isotropic and Magnetically-Oriented Chiral Nematic Suspensions of Cellulose Crystallites," Langmuir, 1997, 13(11): 3029-3034.

Dufresne A., Cavaille J.-Y., Vignon, M.R., "Mechanical Behavior of Sheets Prepared From Sugar Beet Cellulose Microfibrils," Journal of Applied Polymer Science, 1997, 64:1185-1194.

Fukuzumi H., Saito T., Okita Y., Isogai A., "Thermal Stabilization of TEMPO-oxidized Cellulose," Polymer Degradation and Stability, 2010, 95(9):1502-1508.

Habibi Y., Lucia L.A., Rojas O.J., "Cellulose Nanocrystals: Chemistry, Self-assembly and Applications," Chemical Reviews, 2010, 110(6):3479-3500.

Hamad W.Y., Hu T.Q., "Structure-Process-Yield Interrelations in Nanocrystalline Cellulose Extraction," The Canadian Journal of Chemical Engineering, 2010, 88:392-402.

Hayashi N., Kondo T., Ishihara M., "Enzymatically Produced Nano-Ordered Short Elements Containing Cellulose Iβ Crystalline Domains," Carbohydrate Polymers, 2005, 61:191-197.

Henriksson M., Henriksson G. Berglund L.A., Lindström T., "An Environmentally Friendly Method for Enzyme-Assisted Preparation of Microfibrillated Cellulose (MFC) Nanofibers," European Polymer Journal 2007, 43(8): 3434-3441.

Iwamoto S., Nakagaito A.N., Yano H., "Nano-Fibrillation of Pulp Fibers for the Processing of Transparent Nanocomposites," Applied Physics A: Materials Science and Processing, 2007, 89:461-466.

Kenealy W., Horn E., Houtman C.J., "Vapor Phase Diethyl Oxalate Pretreatment of Wood Chips: Part 1, Energy Savings and Improved Pulps," Holzforschung, 2007, 61:223-229.

Marchessault R.H., Morehead F.F., Koch M.J., "Some Hydrodynamic Properties of Neutral Suspensions of Cellulose Crystallites as Related to Size and Shape," Journal of Colloid Science, 1961, 16:327-344.

Moran J.L., Alvarez V.A, Cyras V.P., Vazquez A., "Extraction of Cellulose and Preparation of Nanocellulose From Sisal Fibers," Cellulose, 2008, 15:149-159.

Mukherjee S.M., Woods H.J., "X-ray and Electron Microscope Studies of the Degradation of Cellulose by Sulphuric Acid," Biochimica et Biophysica Acta, 1953, 10:499-511.

Nickerson R.F., Habrle J.A., "Cellulose Intercrystalline Structure," Industrial and Engineering Chemistry, 1947, 39:1507-1512.

Okita Y., Saito T., Isogai A., "TEMPO-Mediated Oxidation of Softwood Thermomechanical Pulp," Holzforschung, 2009, 63:529-535.

Pääkko M., Ankerfors M., Kosonen H., Nykänen A,. Ahola S., Österberg M., Ruokolainen J., Laine J. Larsson P.T., Ikkala O., et al., "Enzymatic Hydrolysis Combined with Mechanical Shearing and High-Pressure Homogenization for Nanoscale Cellulose Fibrils and Strong Gels," Biomacromolecules, 2007, 8:1934-1941.

Revol J.-F., Godbout L., Dong X.-M., Gray D.G., Chanzy H., Maret G., "Chiral Nematic Suspensions of Cellulose Crystallites; Phase Separation and Magnetic Field Orientation," Liquid Crystals, 1994, 16:127-134.

Revol J.-F., Bradford H., Giasson J., Marchessault R.H., Gray D.G., "Helicoidal Self-Ordering of Cellulose Microfibrils in Aequous Suspension," International Journal of Biological Macromolecules, 1992, 14:170-172.

Roman M., Winter W.T., "Effect of Sulfate Groups From Sulfuric Acid Hydrolysis on the Thermal Degradation behavior of Bacterial Cellulose," Biomacromolecules, 2004, 5(5):1671-1677.

Rånby B.G., "The Colloidal Properties of Cellulose Micelles," Discussions of the Faraday Society, 1951, 11:158-164.

Saito T., Kumura S., Nishiyama T., Isogai A., "Cellulose Nanofibers Prepared by TEMPO-Mediated Oxidation of Native Cellulose," Biomacromolecules, 2007, 8:2485-2491.

Saito T., Isogai A., "TEMPO-Mediated Oxidation of Native Cellulose. The Effect of Oxidation Conditions on Chemical and Crystal Structures of the Water-Insoluble Fractions," Biomacromolecules, 2004, 5:1983-1989.

Saito T., Okita T., Nge T.T., Sugiyama J., Isogai A., "TEMPO-Mediated Oxidation of Native Cellulose: Microscopic Analysis of Fibrous Fractions in the Oxidized Products," Carbohydrate Polymers, 2006, 65:435-440.

Sherrard E.C., Kressman F.W., Review of Processes in the United States Prior to World War II. Industrial and Engineering Chemistry, 1945, 37(1):5-8.

Siró I., Plackett D., "Microfibrillated Cellulose and New Nanocomposite Materials: A Review," Cellulose, 2010, 17 (3):459-494.

Turbak A.F., Snyder F.W., Sandberg K.R., "Microfibrillated Cellulose, A New Cellulose Product: Properties, Uses, and Commercial Potential," Journal of Applied Polymer Science, Applied Polymer Symposium, 1983, 37:815-827.

Wang B,. Sain M., Oksman K., "Study of Structural Morphology of Hemp Fiber From the Micro to the Nanoscale," Applied Composite Materials, 2007, 14:89-103.

Wang Q., Zhao X,. Zhu J.Y., "Kinetics of Strong Acid Hydrolysis of a Bleached Kraft Pulp for Producing Cellulose Nanocrystals (CNCS)," Industrial and Engineering Chemistry, 2014, 53(27):11007-11014.

Wang Q.Q., Zhu J.Y., Considine J.M., "Strong and Optically Transparent Films Prepared Using Cellulosic Solid Residue (CSR) Recovered From Cellulose Nanocrystals (CNC) Production Waste Stream," American Chemical Society Applied Materials and Interfaces, 2013, 5(7):2527-2534.

Wang Q.Q., Zhu J.Y., Gleisner R., Kuster T.A., Baxa U., McNeil S.E., "Morphological Development of Cellulose Fibrils of a Bleached Eucalyptus Pulp by Mechanical Fibrillation," Cellulose, 2012a, 19(5):1631-1643.

Wang Q.Q., Zhu J.Y., Reiner R.S., Verrill S.P., Baxa U., McNeil S.E., "Approaching Zero Cellulose Loss in Cellulose Nanocrystal

(56) References Cited

OTHER PUBLICATIONS (CNC) Production: Recovery and Characterization of Cellulosic Solid Residues (CSR) and CNC." Cellulose, 2012b, 19(6):2033-2047.

Wegner T.H., Jones E.P., "A Fundamental Review of the Relationships Between Nanotechnology and Lignocellulosic Biomass." In: Lucia L.A., Rojas O.J., editors. The Nanoscience and Technology of Renewable Biomaterials. 1st ed.: John Wiley and Sons, 2009, p. 1-41.

Yu H., Qin Z., Liang B., Liu N., Zhou Z., Chen L., "Facile Extraction of Thermally Stable Cellulose Nanocrystals with a High Yield of 93% Through Hydrochloric Acid Hydrolysis Under Hydrothermal Conditions," Journal of Materials Chemistry A, 2013, 1(12):3938-3944.

Zhang J., Zhu J.Y. "Optimizing High Titer Ethanol Production From a SPORL Pretreated Poplar Without Detoxification Using a Combined Hydrolysis Factor (CHF)," Bioresource Technology, 2015, (submitted).

Zhou H., Zhu J.Y., Luo X., Leu S.-Y., Wu X., Gleisner R., Dien B.S., Hector R.E., Yang D., Qiu X., et al., "Bioconversion of Beetle-Killed Lodgepole Pine Using SPORL: Process Scale-Up Design, Lignin Coproduct and High Solids Fermentation Without Detoxification," Industrial and Engineering Chemistry Research, 2013, 52 (45):16057-16065.

Zhu J.Y., Sabo R., Luo X., "Integrated Production of Nano-Fibrillated Cellulose and Cellulosic Biofuel (Ethanol) by Enzymatic Fractionation of Wood Fibers," Green Chemistry, 2011, 13(5):1339-1344.

Zhu J.Y., Houtman C.J., Zhu J.Y., Gleisner R., Chen K.F., "Quantitative Predictions of Bioconversion of Aspen by Dilute Acid and SPORL Pretreatments Using a Unified Combined Hydrolysis Factor (CHF)," Process Biochemistry, 2012, 47:785-791.

Šturcová A., Davies G.R., Eichhorn S.J., "Elastic Modulus and Stress-Transfer Properties of Tunicate Cellulose Whiskers," Biomacromolecules, 2005, 6(2):1055-1061.

Liu Y., Wang W., Mu X., et al., "A Novel Approach for the Preparation of Nanocrystalline Cellulose by Using Phosphotungstic Acid," Carbohydrate Polymers, 2014, 110:415-422.

Braun B., Dorgan J., "Single-Step Method for the Isolation and Surface Functionalization of Cellulosic Nanowhiskers," Biomacromolecules, 2009, 10:334-341.

Stamm, A.J., Wood and Cellulose Science, 1964, 549pp.

Segal, L., An Empirical Method for Estimating the Degree of Crystallinity of Native Cellulose Using the X-Ray Diffractometer, 1959, 786-794.

* cited by examiner

FIG. 3: Oxalic acid absorption spectra

FIG. 4: Maleic acid absorption spectra

FIG. 5: Toluenesulfonic acid absorption spectra

FIG. 6: Oxalic acid spectral derivative

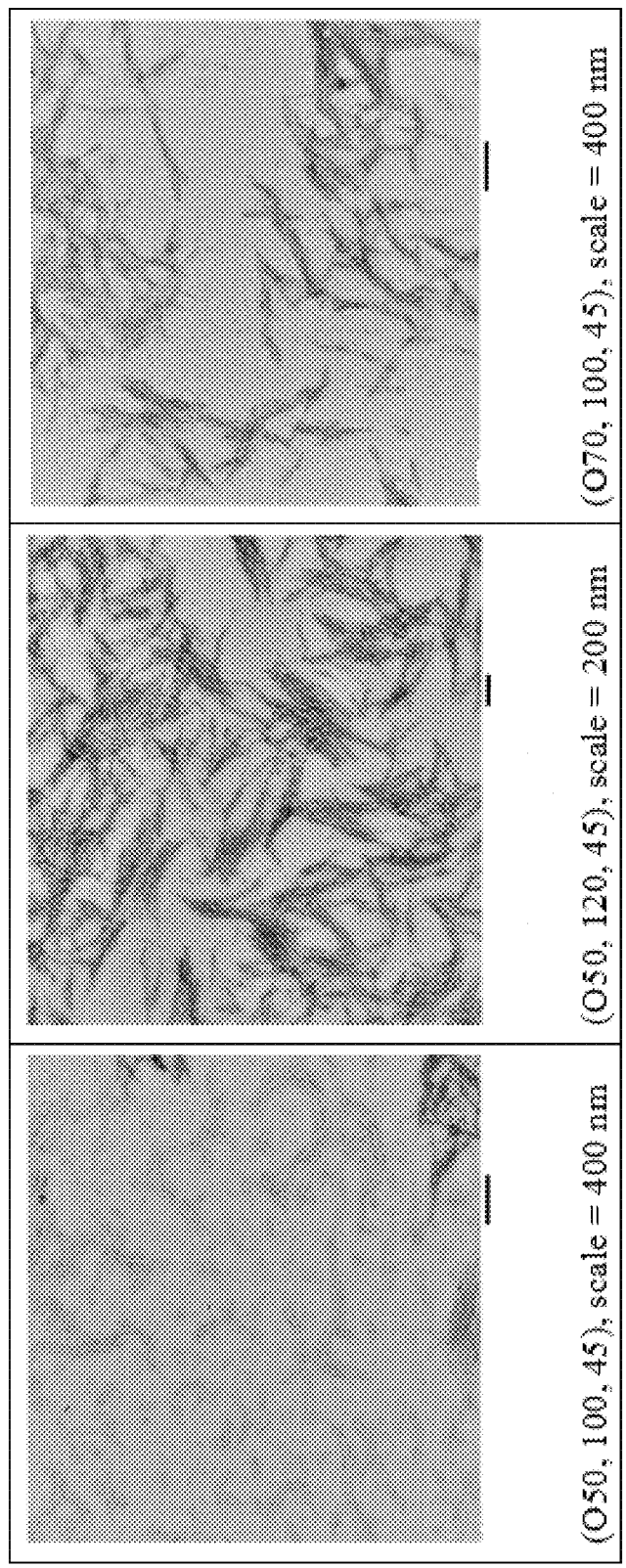

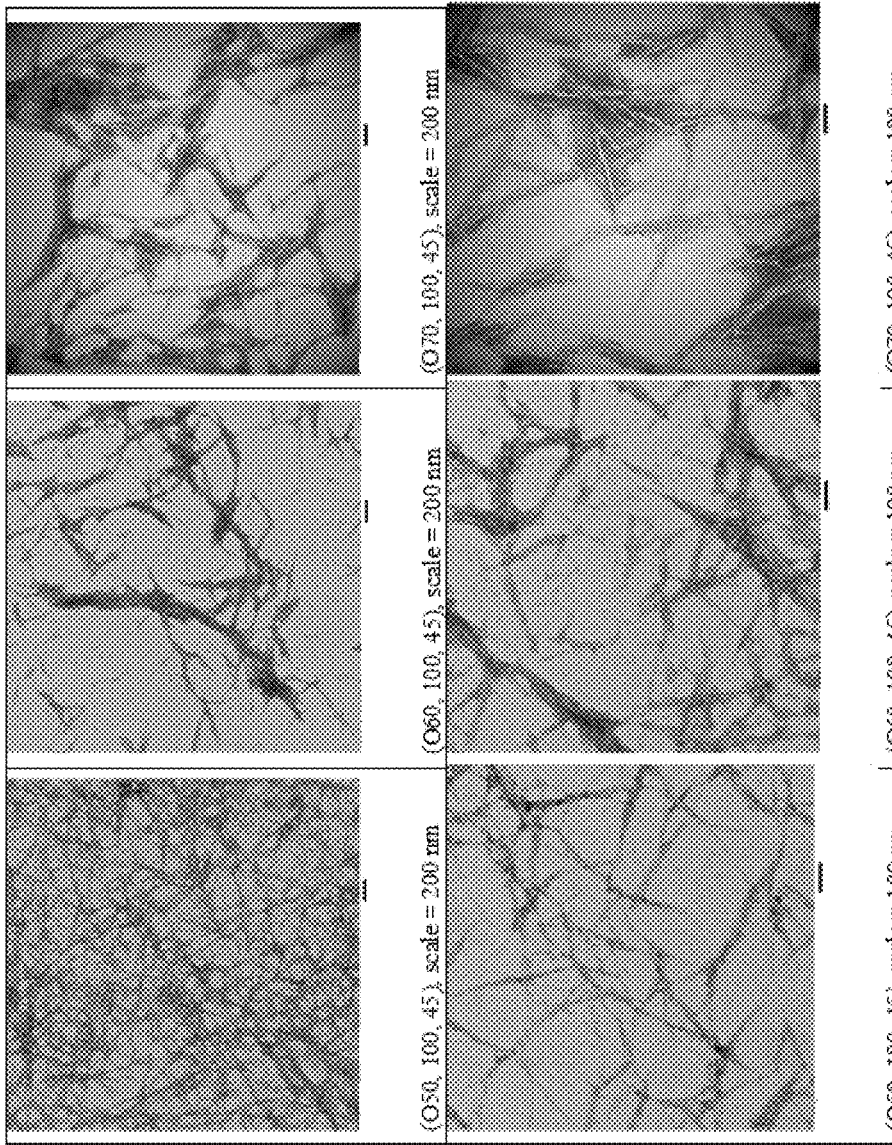

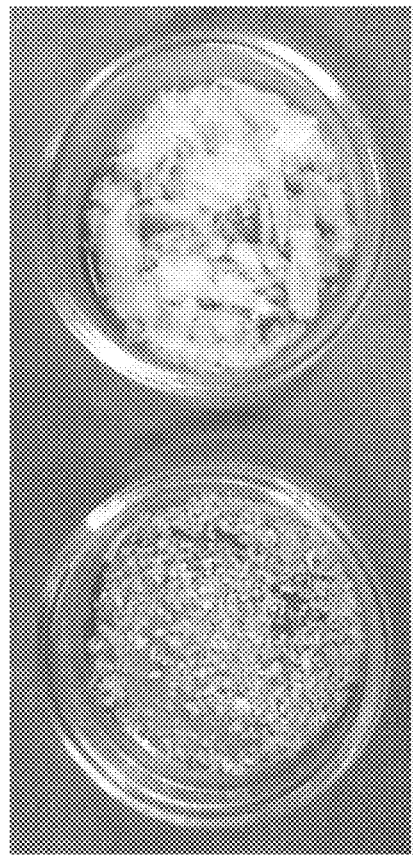# (S64, 45, 45)
(O70, 100, 60)
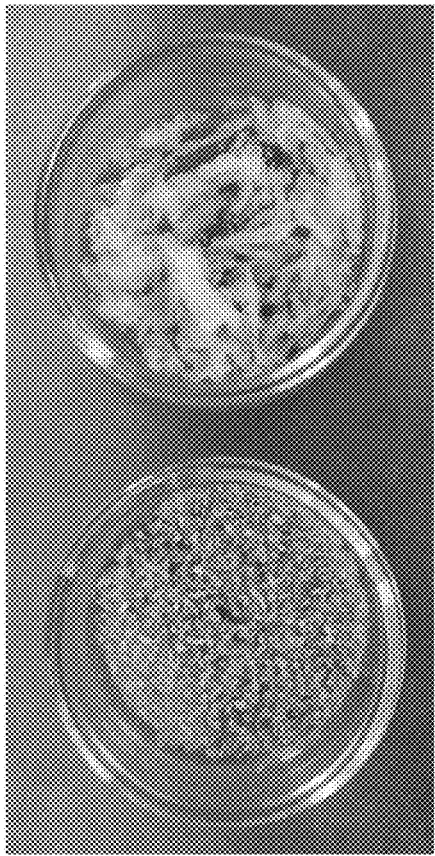
FIG. 14A
FIG. 14B

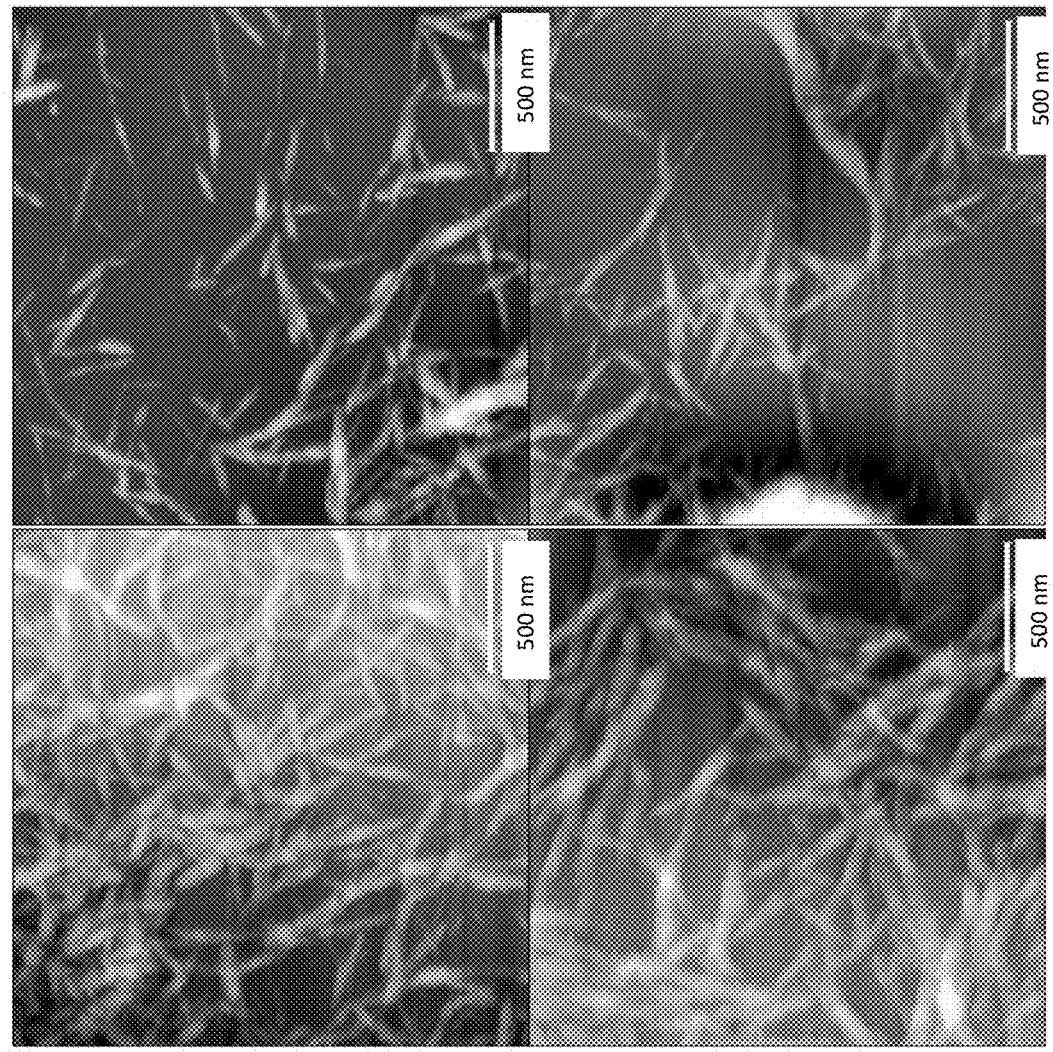
FIG. 22A (O50, 100, 45)
FIG. 22B (O50, 100, 90)
FIG. 22C (O60, 100, 45)
FIG. 22D (O70, 100, 45)

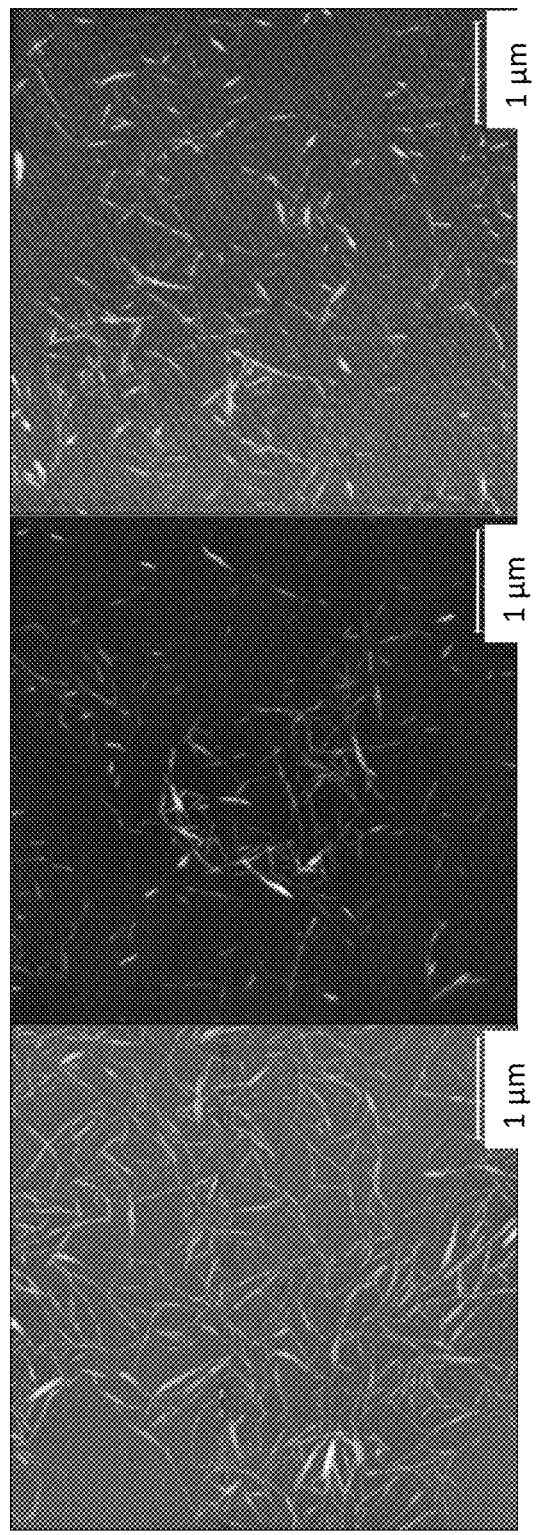
FIG. 23A (O50, 100, 45)   FIG. 23B (O60, 100, 45)   FIG. 23C (O70, 100, 45)

INTEGRATING THE PRODUCTION OF CARBOXYLATED CELLULOSE NANOFIBRILS AND CELLULOSE NANOCRYSTALS USING RECYCLABLE ORGANIC ACIDS

REFERENCE TO GOVERNMENT RIGHTS

This invention is owned by the federal government. The government has certain rights in the invention.

BACKGROUND

Cellulose nanomaterials, such as cellulose nanocrystals (CNC), have unique mechanical and optical properties for a variety of applications. However, most cellulose is naturally embedded in the cell walls of plant lignocellulosic biomass with hemicelluloses and lignin in a hierarchical structure. Efficient extraction or production of cellulose nanomaterials from plant biomass is critical to successful commercial application. The strong acid hydrolysis approach for CNC production is a dominant process today. However, the focus has been on using mineral acids for acid hydrolysis. For example, hydrochloric acid, phosphoric acid, and sulfuric acid have all been used. Unfortunately, the isolated cellulose solids produced by strong acid hydrolysis generally suffer from poor thermal stabilities.

Cellulose nanofibrils (CNF), another kind of cellulose nanomaterial has attracted great attention in recent years for its good mechanical and optical properties. CNF can be produced simply through mechanical fibrillation. The breakdown of the cell wall to the nanofibril level is very energy intensive, which is a significant barrier for commercial CNF production. Chemical pretreatments can reduce this energy consumption. For example, alkaline pretreatment has been applied to separate the structural linkage between lignin and carbohydrate in the cell wall. TEMPO-mediated oxidation has also been used. However, TEMPO is a very expensive chemical and the technique for the recovery of TEMPO still needs to be developed. Furthermore, other chemicals as oxidants used in TEMPO-oxidation, such as NaClO and NaBr, cannot be recovered. In addition, CNF from TEMPO suffers from poor thermal stability for composite applications.

SUMMARY

Cellulose-based materials comprising carboxylated cellulose nanocrystals (CNCs) and/or carboxylated cellulose nanofibrils (CNFs) are provided. Also provided are methods for integrating the production of carboxylated cellulose nanocrystals with the production of other elongated carboxylated cellulose particles, including carboxylated CNFs.

One embodiment of a cellulose-based material comprises at least 90 weight percent, based on the solid content of the material, of cellulose nanocrystals, cellulose nanofibrils, or a mixture thereof, wherein the cellulose nanocrystals, cellulose nanofibrils, or both comprise surface carboxyl group functionalities and have a surface carboxyl group content of at least 0.02 mmol/g; and the material has an onset thermal degradation temperature of about 295° C. or higher than 295° C.

One embodiment of a method for the production of cellulose nanofibrils and cellulose nanocrystals from a feed cellulosic material comprising crystalline cellulosic components and disordered cellulosic components comprises: (a) hydrolyzing disordered cellulosic components in the feed cellulosic material via acid hydrolysis with a weak organic carboxylic acid to obtain a carboxylated cellulosic solid comprising carboxylated cellulose nanocrystals and carboxylated cellulosic solid residues, the carboxylated cellulosic solid residues comprising cellulose fibers, cellulose microfibers, or a combination thereof; (b) separating the carboxylated cellulose nanocrystals from the carboxylated cellulosic solid residues; and (c) subjecting the carboxylated cellulosic solid residues to mechanical shear forces, whereby the carboxylated cellulose nanofibrils are formed. The carboxylated cellulose nanocrystals, carboxylated cellulosic solid residues, and carboxylated cellulose nanofibrils have a surface carboxyl group content of at least 0.02 mmol/g; and the carboxylated cellulose nanocrystals have an onset thermal degradation temperature that is at least 5° C. higher than the onset thermal degradation temperature of the feed cellulosic material.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 9A. Transmission electron microscope (TEM) image of a CNC sample produced via acid hydrolysis using oxalic acid at an acid loading of 50 weight percent (wt. %) at 100° C.

FIG. 9B. TEM image of a CNC sample produced via acid hydrolysis using oxalic acid at an acid loading of 50 weight percent (wt. %) and 120° C.

FIG. 9C. TEM image of a CNC sample produced via acid hydrolysis using oxalic acid at an acid loading of 70 weight percent (wt. %) and 100° C.

FIG. 11A. TEM image of a CNF sample produced via acid hydrolysis with oxalic acid with an acid loading of 50 wt. %.

FIG. 11B. Higher magnification TEM image of the CNF sample produced via acid hydrolysis with oxalic acid with an acid loading of 50 wt. %.

FIG. 11C. TEM image of a CNF sample produced via acid hydrolysis with oxalic acid with an acid loading of 60 wt. %.

FIG. 11D. Higher magnification TEM image of the CNF sample produced via acid hydrolysis with oxalic acid with an acid loading of 60 wt. %.

FIG. 11E. TEM image of a CNF sample produced via acid hydrolysis with oxalic acid with an acid loading of 70 wt. %.

FIG. 11F. Higher magnification TEM image of the CNF sample produced via acid hydrolysis with oxalic acid with an acid loading of 70 wt. %.

FIG. 14A. Visual comparison of the thermal stability of a CNC sample produced using sulfuric acid (S64, 45, 45) and a CNC sample produced using oxalic acid (O70, 100, 60) through thermal treatment at 105° C. for 4 hours.

FIG. 14B. Visual comparison of the thermal stability of a CNC sample produced using sulfuric acid (S64, 45, 45) and a CNC sample produced using oxalic acid (O70, 100, 60) through thermal treatment at 105° C. for 24 hours.

FIG. 22A. AFM image of solids produced under the conditions: O50, 100, 45.

FIG. 22B. AFM image of solids produced under the conditions: O50, 100, 90.

FIG. 22C. AFM image of solids produced under the conditions: O60, 100, 45.

FIG. 22D. AFM image of solids produced under the conditions: O70, 100, 45.

FIG. 23A. AFM image of solids produced under the conditions: O50, 100, 45.

FIG. 23B. AFM image of solids produced under the conditions: O60, 100, 45.

FIG. 23C. AFM image of solids produced under the conditions: O70, 100, 45.

DETAILED DESCRIPTION

Figure 1:
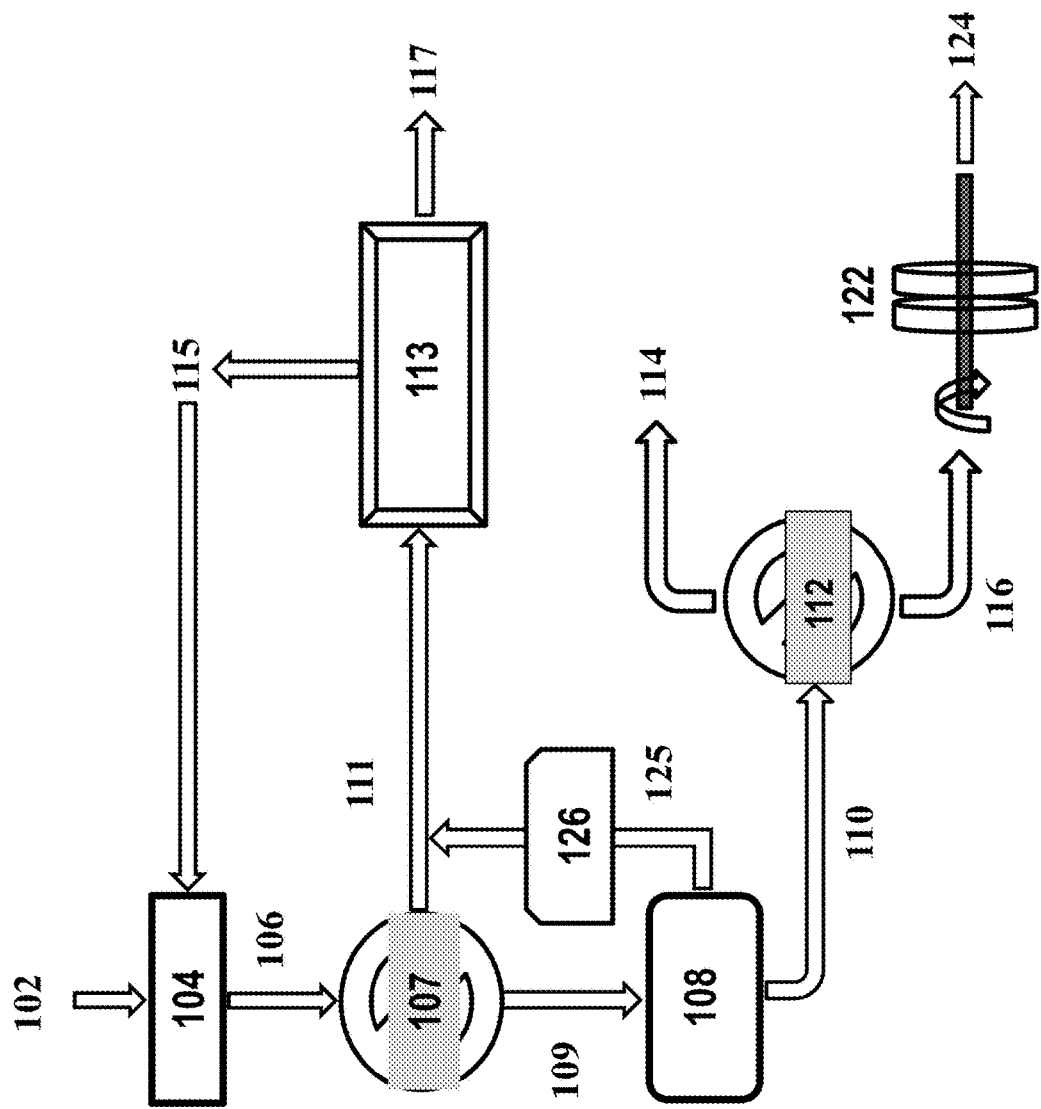
FIG. 1. Schematic process diagram for one embodiment of the integrated production of CNCs and CNFs from a cellulosic material.

Methods for integrating the production of carboxylated CNCs and carboxylated CNFs from cellulose are provided. Carboxylated CNCs, carboxylated cellulosic solid residues (CSRs) in the form of cellulose fibers (CF) and/or cellulose microfibrils (CMFs), and carboxylated CNFs fabricated using the methods are also provided. The methods are based on the acid hydrolysis of a cellulosic material using weak solid organic acids to produce carboxylated CNCs and CNFs with high cellulose crystallinity indices and thermal stabilities that are higher than the thermal stabilities of the cellulosic materials.

Aspects of the technology described herein are based, at least in part, on the inventors' realization that acid hydrolysis of cellulosic materials using weak solid organic acids at high mass loadings yields carboxylated cellulosic solids comprising CNCs in combination with other non-CNC cellulose solids, referred to as CSRs, and that these CSRs can be used as a feedstock in the production of carboxylated CNFs. The use of the weak solid organic acids provides carboxylated CNCs and CSRs that have high cellulose crystallinity indices and improved thermal stabilities and eliminates the need to include inorganic acids in the hydrolysis. In addition, because some organic acids can be crystallized and recovered after the acid hydrolysis, their use enhances the overall efficiency of the process. For organic acids that cannot be crystallized, the recovery of acid can also be achieved simply by using the hydrolysate (containing mainly acid with some soluble sugars) for future hydrolysis runs after replenishing any loss of acid in the prior hydrolysis run. Evaporating the excess water in the filtrate from washing the hydrolyzed cellulosic solid may be needed.

Because the nomenclature used to describe cellulose particles has not been standardized and some terms may be used inconsistently within the literature, definitions for the various types of cellulose particles referred to in this disclosure are provided below.

Cellulosic Material:

As used herein, the term cellulosic material refers to a substance that comprises cellulose, hemicellulose, and lignin, and, optionally, a trace amount of other wood or lignocellulosic biomass components.

Cellulose Nanocrystals (CNCs):

As used herein, the term CNC refers to elongated rod-like crystalline cellulose nanoparticles. CNCs comprise cellulose chains extracted from natural cellulosic materials by depolymerizing the disordered cellulose using acid. CNCs can be in the form of single cellulose crystallite or a bundle of cellulose crystallites. "Cellulose crystallites" are described in Stamm A. J. 1964. *Wood and Cellulose Science*. New York: The Ronald Press Company. 549 p. CNCs are characterized by lengths in the range from about 60 to about 1000 nm; widths in the range from about 5 to about 50 nm; and corresponding aspect ratios in the range from about 1 to about 200. CNCs are sometimes referred to as nanocellulose crystals (NCCs).

Cellulose Nanofibrils (CNFs):

As used herein, the term CNF refers to long flexible fiber-like cellulose nanoparticles. CNFs can be branched or unbranched and can take the form of a network of flexible fiber-like nanoparticles. CNFs comprise cellulose, hemicellulose, and, optionally, even lignin. The fiber-like cellulose particles are characterized by lengths in the range from about 100 to about 5,000 nm; widths in the range from about 5 to about 200 nm; and corresponding aspect ratios in the range from about 2 to about 1,000. CNFs are sometimes referred to as Nanocellulose fibrils (NFC) or nanofibers.

Cellulose Fibers (CFs):

As used herein, the term CF refers to cellulose particles. CFs comprise cellulose, hemicellulose, and, optionally, lignin. CFs are characterized by lengths in the range from about 0.05 to about 3 mm; widths in the range from about 5 to about 50 µm; and corresponding aspect ratios in the range from about 2 to about 500. CFs are sometimes referred to as fibers or fines.

Cellulose Microfibers (CMFs):

As used herein, the term CMF refers to cellulose microparticles. CMFs comprise cellulose, hemicelluloses and, optionally, lignin. CMFs are characterized by lengths in the range from about 5 to about 50 µm; widths in the range from about 0.1 to about 5 µm; and corresponding aspect ratios in the range from about 2 to about 500. CMFs are sometimes referred to as cellulose microfibrils (CMFs), microcellulose fibers (MCFs), microcellulose fibrils.

Cellulosic Solid Residues (CSRs):

As used herein, the term cellulosic solid residue refers to a solid material composed of CFs, CMFs, or a combination thereof. In the present methods, CSRs are the solid material remaining after separating out the CNC produced via acid hydrolysis from a starting cellulosic material comprising cellulose, hemicellulose, and, optionally, lignin. CSRs are sometimes referred to as lignocellulosic solid residues (LC-SRs) if lignin is present.

The present methods for forming cellulose particles, such as CNCs, CSRs and CNFs, from cellulosic materials derived from natural sources of cellulose involve the step of subjecting a cellulosic material to an acid hydrolysis using a weak organic carboxylic acid in order to at least partially hydrolyze amorphous cellulosic components and isolate the remaining solid cellulosic components in the form of carboxylated CNCs and carboxylated CSRs. The CSRs can then be separated from the CNCs and, optionally, used as feedstock for the formation of carboxylated CNFs. As such, the present methods provide for the integrated production of both carboxylated CNCs and carboxylated CNFs starting from the same cellulose source material, desirably with minimal loss of cellulose.

A schematic diagram of an embodiment of a process flow for integrating the production of CNCs and CNFs is shown in FIG. 1. As shown here, a cellulosic material 102 undergoes organic acid hydrolysis 104 to produce a suspension 106 comprising a blend of CNCs and CSRs 109. Suspension 106 is then filtered 107 and the CNCs and CSRs 109 are subjected to washing (or dialysis) 108 for purification. The purified product 110 is then centrifuged 112 in order to separate the CNCs 114, which come out in the supernatant, from the CSRs 116 comprising CFs and CMFs. CSRs 116 are then used as a feedstock in a mechanical shearing process 122 to form CNFs 124. The supernatant 111 derived from suspension 106 is then treated to crystallize and recover 113 solid acids 115, which can be cycled back into the acid hydrolysis 104. The washing filtrate 125 also can be recycled for acid recovery through crystallization after the evaporator 126 to remove excess water. Dissolved sugars 117 can be separately recovered. A more detailed description of a method for integrating the production of carboxylated CNCs and CNFs is provided in the Example.

The cellulosic material that is used as the starting material in the acid hydrolysis is typically a material that is composed predominantly of cellulose and hemicelluloses with a certain amount of lignin. Thus, a cellulosic material for use as a starting material in the present methods is one that comprises at least about 80 weight percent (wt. %) cellulose and hemicellulose and not more than about 20 wt. % lignin, where the recited wt. % values are based on the solids content of the material. In some embodiments, the methods may use cellulosic materials having significantly higher cellulose and hemicellulose contents (e.g., ≥85 wt. %, ≥90 wt. %, ≥95 wt. %, ≥99 wt. %) and significantly lower lignin contents (e.g., ≤15 wt. %, ≤10 wt. %, ≤5 wt. %, ≤1 wt. %). The cellulosic material can be made by pre-treating natural cellulose source materials (e.g., lignocellulosic biomass) to partially or completely remove matrix materials, such as lignin and hemicelluloses to provide a purified cellulosic material. Natural cellulose source materials include wood, plants, tunicates, algae and bacteria. Bleached wood pulp is an example of a purified cellulosic material derived from a natural cellulose source.

The cellulose in the cellulosic material will include both crystalline and disordered components. Specifically, natural cellulose fibrils will include crystalline domains, in which the polymeric cellulose chains are highly ordered, and disordered domains, in which the cellulose chains are less ordered. Acid hydrolysis is used to hydrolyze the disordered components into soluble sugars, such that the remaining solid components can be isolated and extracted.

In the present methods the acid hydrolysis conditions are controlled such that the isolated solids include carboxylated CNCs and carboxylated CSRs having thermal stabilities that are higher than the thermal stability of the cellulosic material from which they are derived. This can be accomplished by using hydrolysis conditions that are less severe than those conventionally employed to maximize CNC yield and by employing appropriate weak solid carboxylic acids at sufficiently high mass loadings. In addition to being more thermally stable than the cellulosic material from which they are derived, the isolated solids can have higher thermal stabilities than CNCs and CSRs produced via the same acid hydrolysis procedure in which an inorganic mineral acid, such as hydrochloric acid or sulfuric acid, is used instead of the solid organic acid.

The thermal stability of the material comprising isolated CNCs, the CNFs formed from the material comprising isolated CSRs, and the cellulosic materials from which they are derived can be measured by their onset thermal degradation temperatures. As used herein, the onset thermal degradation temperature is where the derivative of the thermal weight loss curve (dW/dT) is −1, as illustrated in the Example. Some embodiments of the material comprising isolated CNCs and/or the CNFs formed from the material comprising isolated CSRs have an onset thermal degradation temperature that is at least 5° C. higher than the onset thermal degradation temperature of the cellulosic material from which it is derived. This includes embodiments of the materials that have an onset thermal degradation temperature that is at least 10° C. higher than the onset thermal degradation temperature of the cellulosic material from which they are derived and further includes embodiments of the materials that have an onset thermal degradation temperature that is at least 30° C. higher than the onset thermal degradation temperature of the cellulosic material from which they are derived, and still further includes embodiments of the materials that have an onset thermal degradation temperature that is at least 45° C. higher than the onset thermal degradation temperature of the cellulosic material from which they are derived. Onset thermal degradation temperature increases of these magnitudes can also be achieved relative to materials comprising isolated CNCs and CNFs that are produced via acid hydrolysis using inorganic acids, such as phosphoric acid, sulfuric acid, and hydrochloric acid. Included within these embodiments are materials comprising isolated CNCs and/or CNFs having onset thermal degradation temperatures of at least 295°, at least 300° C., at least 310° C. and at least 320° C. (e.g., in the range from 295° C. to 330° C.).

This improved thermal stability can be attributed to increased crystallinity of the materials comprising the isolated CNCs and CSRs, as determined by their cellulose crystallinity indices (CrI), which is the mass fraction of crystalline domains in the materials. By way of illustration, some embodiments of the material obtained by isolating the CNCs produced via the acid hydrolysis of a cellulosic feedstock have a CrI of at least 78%. This includes embodiments of the materials having a CrI of at least 80%, at least 81%, and at least 82%.

The solid organic acids are characterized in that they are solids at room temperature (20° C.) and can be readily recovered from the reaction solution after acid hydrolysis via crystallization. The solid organic acids also include their anhydrate form that can react with water to form acid, for example, maleic anhydride. The organic acid used in the acid hydrolysis is desirably an acid that is capable of functionalizing the CNCs, CSRs, and CNFs with surface carboxyl groups. Thus, dicarboxylic acids, such as oxalic acid, maleic acid, maleic anhydride, or mixtures thereof, are well-suited for use in the methods. The introduction of surface carboxyl groups is advantageous because it facilitates the dispersion of the cellulose particles in aqueous solution due to surface charges. The solid organic acids can be added into the hydrolysis reaction solution, or can be made in situ in the reaction solution. For example, maleic anhydride can be added to the hydrolysis reaction solution where it reacts with water to form maleic acid. Although the focus of this disclosure related to the use of solid organic carboxylic acids that produce carboxylated cellulose nanoparticles, the methods can also be carried out using other solid organic acids that do not produce surface carboxyl functionalities. Examples of such solid organic acids include p-toluenesulfonic acid and benzenesulfonic acid.

The chosen organic acids desirably have low solubility at ambient temperature so that they can be recovered through crystallization, but relatively high solubility at elevated temperature, e.g., approximately 100° C. or higher. Dicarboxylic acids are useful as they can functionalize cellulose with surface carboxyl group in addition to esterifying cellulose. The organic dicarboxylic acids typically have a pKa in the range from 0 to 3.5. A pKa higher than 3.5 may result in insufficient hydrolysis of hemicelluloses and disordered cellulose for cellulose nanocrystal production. A very low pKa may degrade cellulose to result in low crystallinity. However, as illustrated in the Example, p-toluenesulfonic acid with pKa of −2.8 can be used to provide a cellulose material with good thermal stability and very high crystallinity. Some dicarboxylic acids, such as fumaric acid and malonic acid, have the correct pKa, but cannot be crystallized. However, these acids can also be recycled simply by reusing the acid after hydrolysis, and therefore are also suitable candidates.

The acid loading in the acid hydrolysis solution should be high enough to esterify the CNCs and CSRs and to provide materials with high enough CrI to improve their thermal stabilities relative to those of the starting cellulosic feedstock material. Increased esterification and therefore carboxylation can be achieved by using a catalyst, such as an acid. Thus, in some embodiments of the methods, the organic acid loading, based on acid mass concentration, is at least 10 wt. %. This includes embodiments in which the organic acid loading is at least 30 wt. % or at least 40 wt. %, based on acid mass concentration. For example, the acid loading, based on acid mass concentration in the acid hydrolysis solution can be in the range from 40 wt. % to 70 wt. %; from 50 wt. % to 70 wt. % or from 60 wt. % to 70 wt. %. At lower loadings, it may be desirable to include a hydrolysis catalyst, such as an inorganic mineral acid, to improve esterification and therefore carboxylation. However, the methods can be conducted in the absence of such catalysts.

The extent of the esterification and carboxylation of the CNCs, CSRs, and CNFs will depend on the organic acid that is used, the acid loading, the time and duration of the hydrolysis, as illustrated in the Example. The hydrolysis temperature may be, for example, in the range from 80° C. to 130° C. However, temperatures outside this range can be used. By way of illustration only, some embodiments of the CNCs, CSRs, and/or CNFs will have a surface carboxyl group content of at least 0.02 mmol/g CNC or CNF. This includes embodiments of the CNCs, CSRs, and/or CNFs that have a surface carboxyl group concentration of at least 0.05 mmol/g; 0.1 mmol/g; 0.15 mmol/g; at least 0.2 mmol/g; and further includes embodiments of the CNCs, CSRs, and/or CNFs that have a surface carboxyl group concentration of at least 0.3 mmol/g; a surface carboxyl group concentration of at least 0.6 mmol/g; a surface carboxyl group concentration of at least 1 mmol/g; and a surface carboxyl group concentration of at least 1.5 mmol/g. For example, the surface carboxyl group concentration can be in the range from 0.02 mmol/g to 2 mmol/g. The carboxyl group concentrations recited herein refer to concentrations determined using conductmetric titration, as illustrated in the Example.

Upon completion of the acid hydrolysis, the solids can be filtered from the solution and the organic acids in the filtrate can be crystallized, recovered, and, optionally, recycled back into the acid hydrolysis reaction chamber. The extent of recovery of the organic acids can be very high, rendering the process highly efficient. For example, as illustrated in the Example, acid recoveries, based on weight, of at least 90% can be achieved. If the used organic acid has high solubility then crystallization may not be possible, but the acid can still be recovered simply by evaporating excess water (or extracting the solvent) to reconstitute the hydrolysate to the required acid concentration for reuse (recycle) in the subsequent hydrolysis reaction.

Although the organic acids used in the acid hydrolysis may be characterized as weak acids, they are sufficiently strong and present at sufficiently high concentrations that a substantial fraction of the cellulose solid particles produced by the hydrolysis are CNCs, which have nanoscale diameters and, therefore, high aspect ratios. For example, as illustrated in the Example, the acid hydrolysis can be conducted such that the product cellulose solids comprise at least 5 wt. % CNC. This includes embodiments in which the cellulose solids produced via the acid hydrolysis comprise at least 8 wt. %; at least 10 wt. %; at least 15 wt. %; and at least 20 wt. % CNCs. The average aspect ratio for a sample of isolated CNCs can be determined by measuring the nanocrystal diameters (heights) and lengths based on atomic force microscope (AFM) images of the sample, as illustrated in the Example. By way of illustration, some embodiment of the isolated CNCs have an average aspect ratio of at least 10. This includes embodiments in which the CNCs have an average aspect ratio of at least 20; and further includes embodiments in which the CNCs have an average aspect ratio of at least 30. For example, the average aspect ratio of the CNCs produced via the organic acid hydrolysis can be in the range from 20 to 50 or in the range from 30 to 50.

Moreover, as discussed below, the CSRs that are separated from the CNCs can be substantially entirely converted into CNFs via mechanical fibrillation. As a result, the present methods are able to convert a cellulosic material into crystalline cellulosic nanoparticles, with a very low yield of crystalline cellulosic particles having micro- or macro-scale diameters.

Once formed, the CSRs can be separated from the CNCs using, for example, conventional filtration and/or centrifugation techniques after the ionic strength is reduced to provide high purity CNC and CSR materials. Although, the separated solid products corresponding to the CNCs and the CSRs may each contain small amounts of the other product, each will be composed predominantly of either CNCs or CSRs, respectively. Therefore, the separated products may be characterized by maximums in their cellulose particle length and width distributions that fall within the length and width ranges defined above for each type of particle. In some embodiments, the materials comprising the separated CNCs and CSRs comprise at least 90 wt. %, at least 95 wt. %, at least 98 wt. %, or at least 99 wt. % of their respective primary particle (i.e., either the CNCs or CSRs).

The CSRs obtained from the organic acid hydrolysis are themselves a useful product for a broad range of applications. For example, the CSRs can be incorporated into coatings, such as barrier coatings or antimicrobial coatings, or other films. They can also be used as reinforcing fillers in polymer composites or as thickening agents. Alternatively, the CSRs can be used as a starting material for the production of CNFs. In this case, separation of CNCs may not be necessary if the primary interest is to produce CNFs and the CNC yield is reduced through low hydrolysis severity. Eliminating the CNC separation step may facilitate acid recovery by reducing water usage in washing.

CNFs can be fabricated from the CSRs using mechanical refining. For example, CNFs can be produced via mechanical shearing and homogenization, whereby the CSRs are subjected to high mechanical shear forces which results in the fibrillation of the CSRs to produce the CNFs. The use of the CSRs as a feedstock for CNF production is advantageous because the acid exposure during the hydrolysis removed hemicelluloses and weakens the cellulose chains and facilitates dispersion of the nanofibrils.

The integrated production of carboxylated CNCs and carboxylated CNFs is able to provide substantially improved cellulosic solid yields with near zero cellulose loss. It also can tailor the yield ratios of the CNCs and CNF and the morphologies of the CNCs and CNFs. Thus, in some embodiments, the present methods provide a total cellulosic solid yield, based on the total cellulose content of the cellulosic material used as the starting material that contains approximately 15% hemicelluloses, of at least 40%. This includes embodiments in which the total cellulosic solid yield is at least 60%, at least 80% and at least 95%. The total cellulosic solid yield can be broken down into the solid yield for the CNCs and CSRs. Thus, in some embodiments, the total CNC yield is at least 10%. This includes embodiments in which the total CNC yield is at least 25%, further includes embodiments in which the total CNC yield is at least 30%, and still further includes embodiments in which the total CNC yield is at least 45%. Similarly, in some embodiments, the total CSR yield is at least 5%. This includes embodiments in which the total CSR yield is at least 55% and further included embodiments in which the total CSR yield is at least 90%. Thus, in most embodiments, the cellulosic solids material produced by the acid hydrolysis comprises more CSR than CNC simply because of the weak acid used.

The high solid yields are due, at least in part, to the use of weak acid and the hydrolysis conditions that reduce or minimize the loss of cellulose through degradation into soluble sugars. Thus, in some embodiment of the present methods, cellulose loss to degradation into soluble sugars is no greater than 15%. This includes embodiments in which cellulose loss to degradation into soluble sugars is no greater than 5%, further includes embodiments in which cellulose loss to degradation into soluble sugars is no greater than 1%.

EXAMPLE

The following example provides a non-limiting illustration of the use of the present methods to integrate the production of carboxylated CNCs with the fabrications of carboxylated CNFs.

Materials

Figure 2:
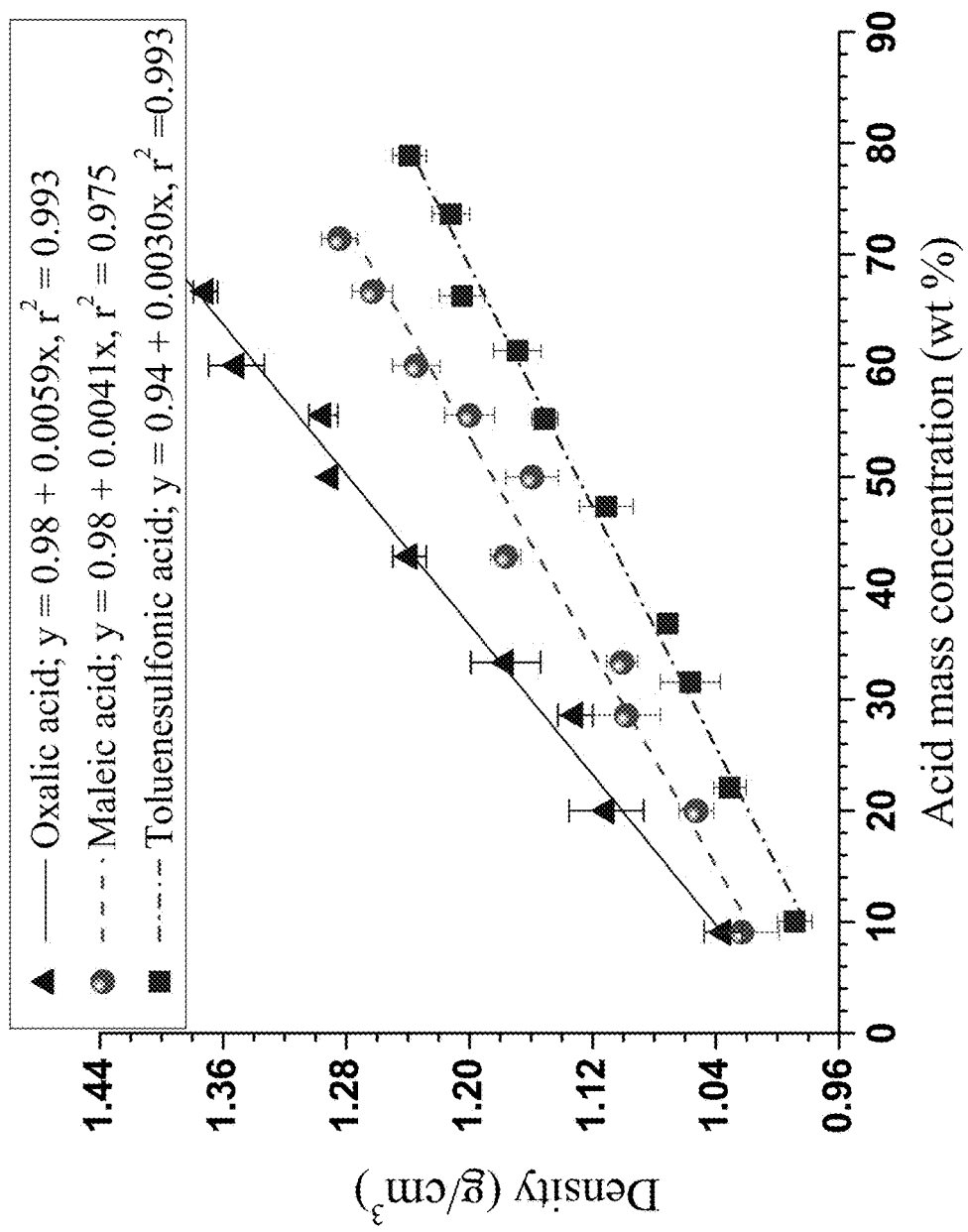
FIG. 2. Graph showing the density of various solid organic acids as a function of concentration.

Sulfuric, hydrochloric, phosphoric, oxalic, maleic acids, oxalic anhydrous, and maleic anhydride, p-toluenesulfonic and benzenesulphonic acids were purchased from Sigma-Aldrich (St. Louis, Mo.). The densities of different organic acid aqueous solution at 100° C. were measured and are shown in FIG. 2.

A bleached kraft eucalyptus dry lap pulp (BEP) was obtained from a commercial source (Fibria, Aracruz Cellulose, Brazil). The BEP had a glucan content of 78.1±1.0%, xylan 15.5±0.6%, and Klason Lignin of 0.1±0.1%. The dry lap was soaked in water overnight and disintegrated for 10,000 revolutions at 3120 rpm and 2% consistency at room temperature using a disintegrator (Model 73-06-01, TMI, Ronkonkoma, N.Y., USA). The pulp was then vacuum dewatered and air dried to approximately 5% moisture content.

Determination of the Solubilities Solid Organic Acids

Figure 3:
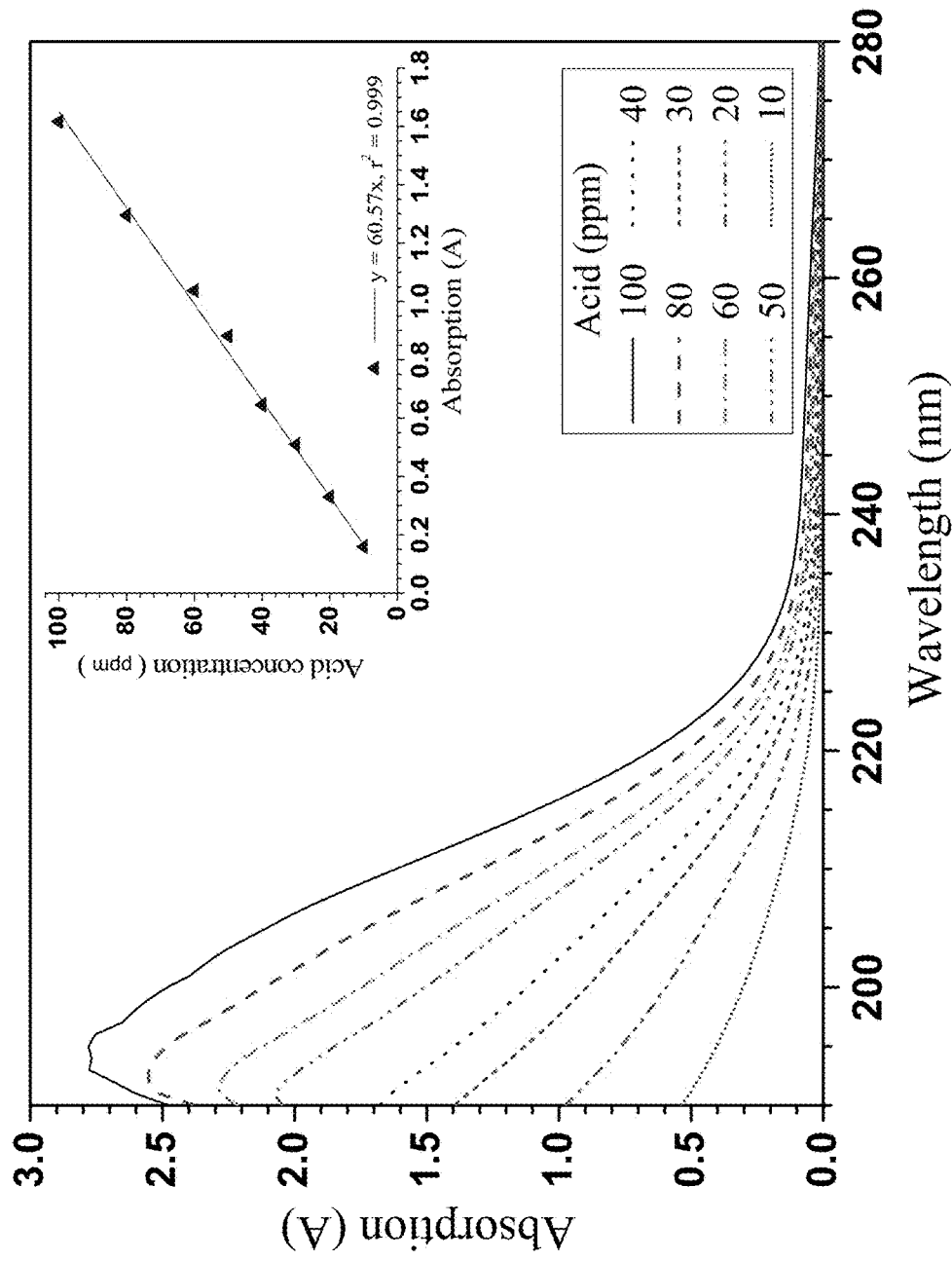
FIG. 3. UV Absorption spectrum for oxalic acid.
Figure 4:
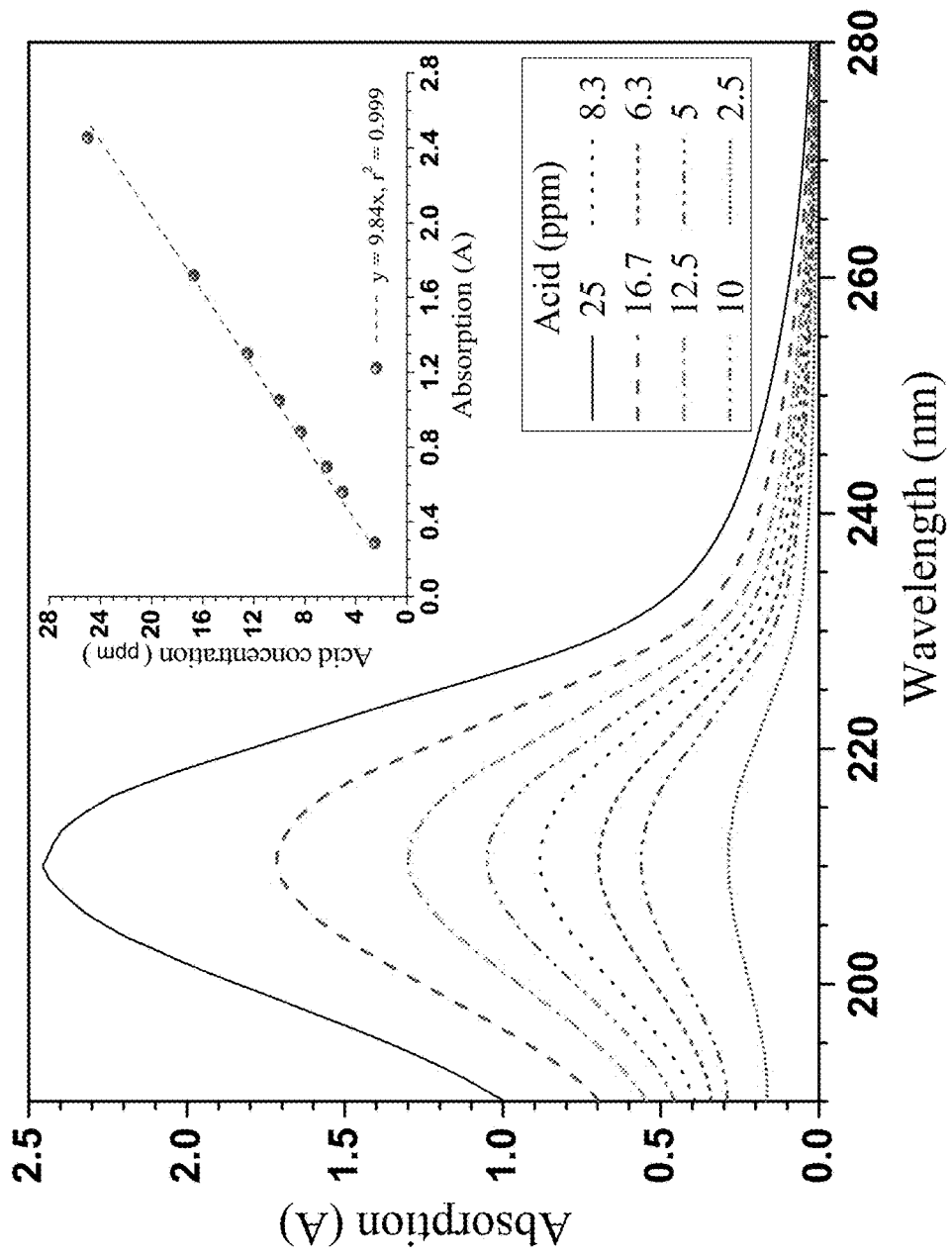
FIG. 4. UV Absorption spectrum for maleic acid.
Figure 5:
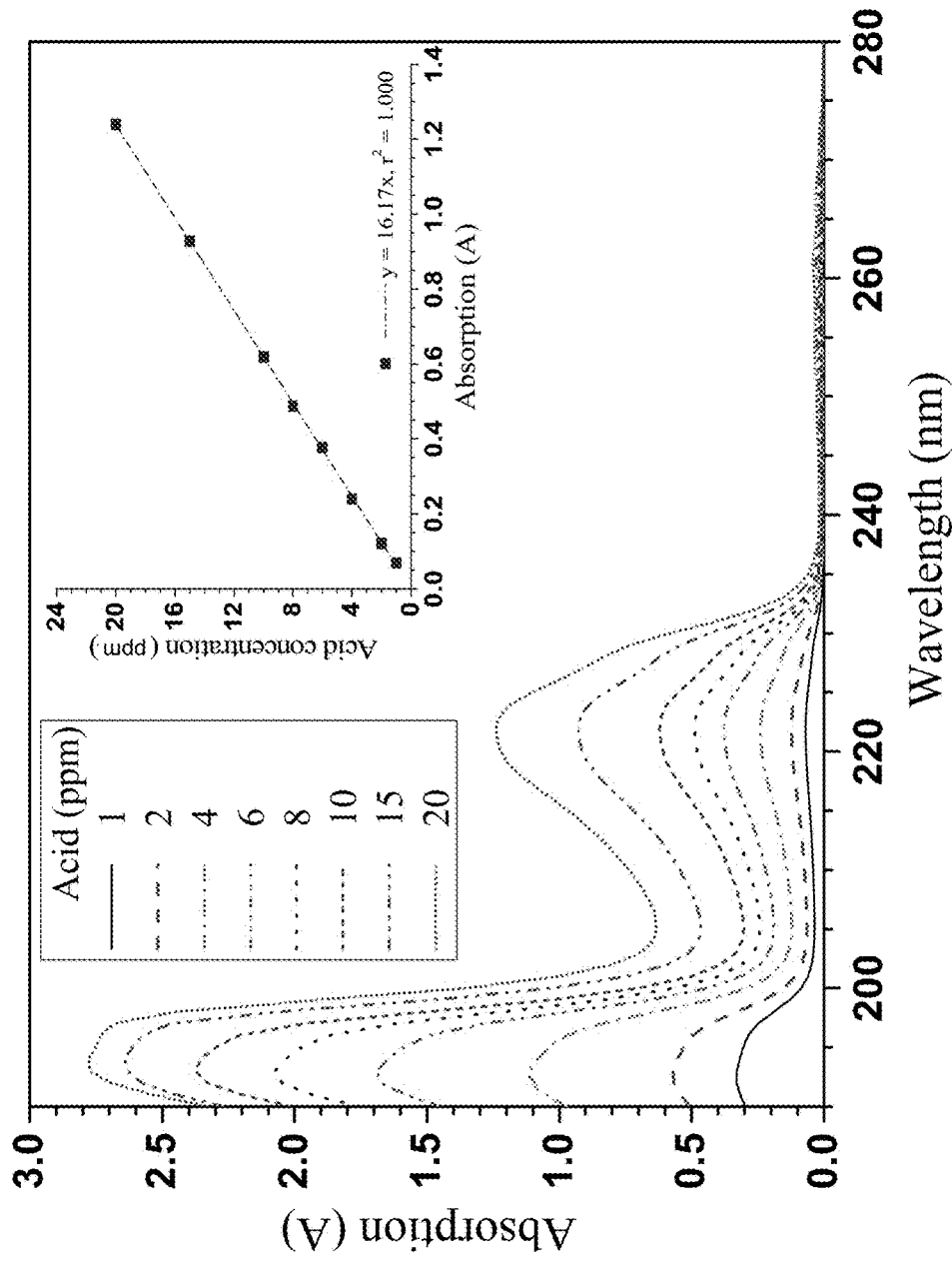
FIG. 5. UV Absorption spectrum for toluenesulfonic acid.
Figure 6:
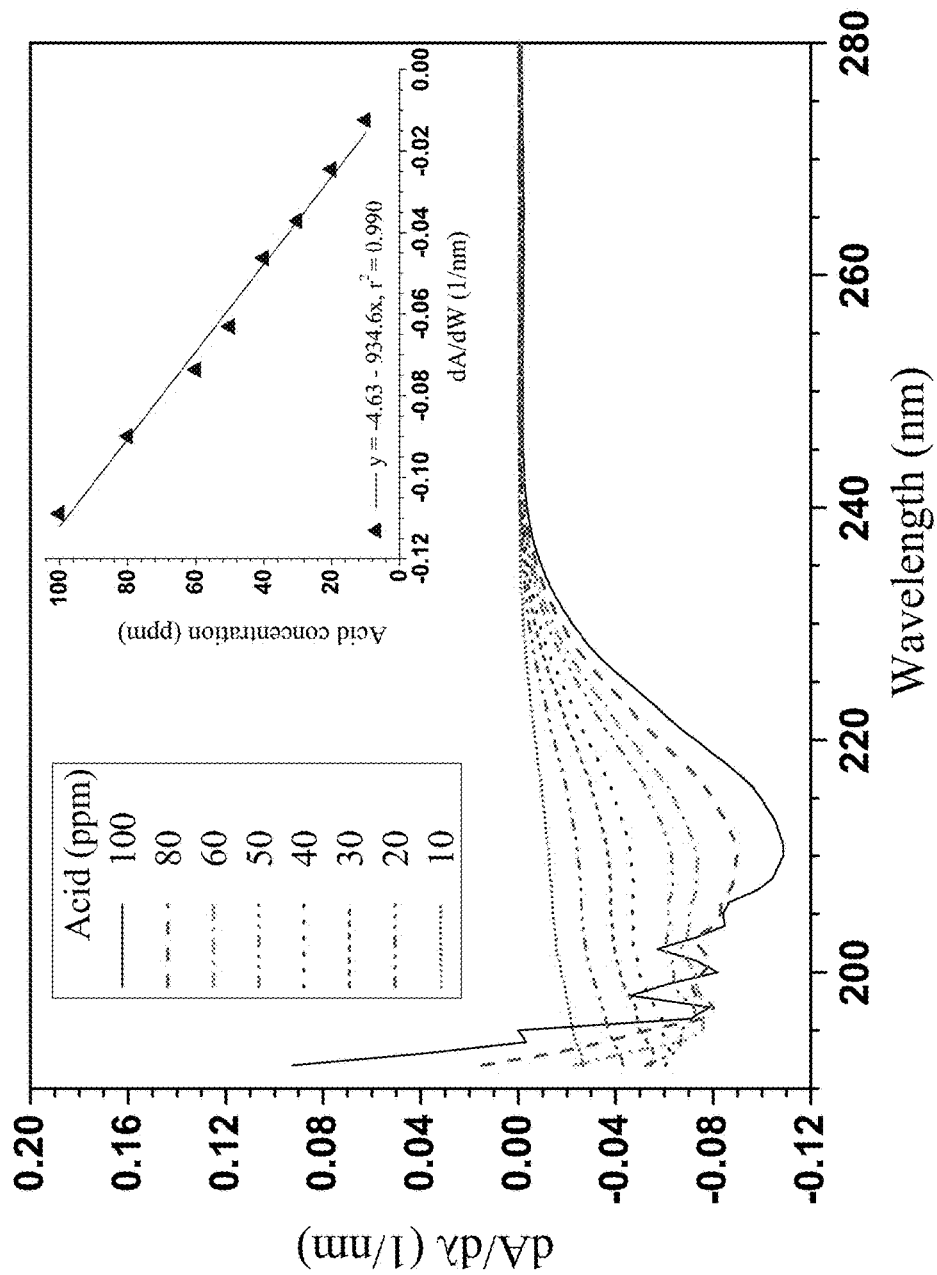
FIG. 6. Graph of the derivative UV absorption of oxalic acid as a function of wavelength.

The solubilities of the solid organic acids in water at different temperatures can provide two pieces of important information for the present invention: (1) the upper-limit of acid concentrations to be used for acid hydrolysis; (2) the potential of recovery of these acids as solids through crystallization and precipitation at a lower temperature. UV absorption spectrophotometric methods were employed for rapidly determining the soluble acid concentration in the solution. The UV-absorption spectra for oxalic, maleic, and toluenesulfonic acids are shown in FIGS. 3, 4, and 5, respectively. Maleic and toluenesulfonic acids have absorption peaks at 210 and 222 nm, respectively. The absorptions at these two wavelengths were used to determine the amounts of soluble maleic and toluenesulfonic acids, respectively, through calibration as shown in FIGS. 4, and 5. The absorption spectra of oxalic acids do not have absorption peaks, however, the absorption intensity at wavelength 210 nm can also be used for quantification through calibration (FIG. 3). Furthermore, the derivative of oxalic acid vs wavelength at 210 nm can also be used for quantification through calibration (FIG. 6). The results shown in FIGS. 3, 4, 5, and 6 indicate that excellent linear relationships between soluble acid concentrations and absorption intensities (or derivatives of absorption for oxalic acid) were obtained through the calibrations. Therefore, accurate acid concentrations in solutions can be quickly determined through UV absorption measurements.

Figure 7:
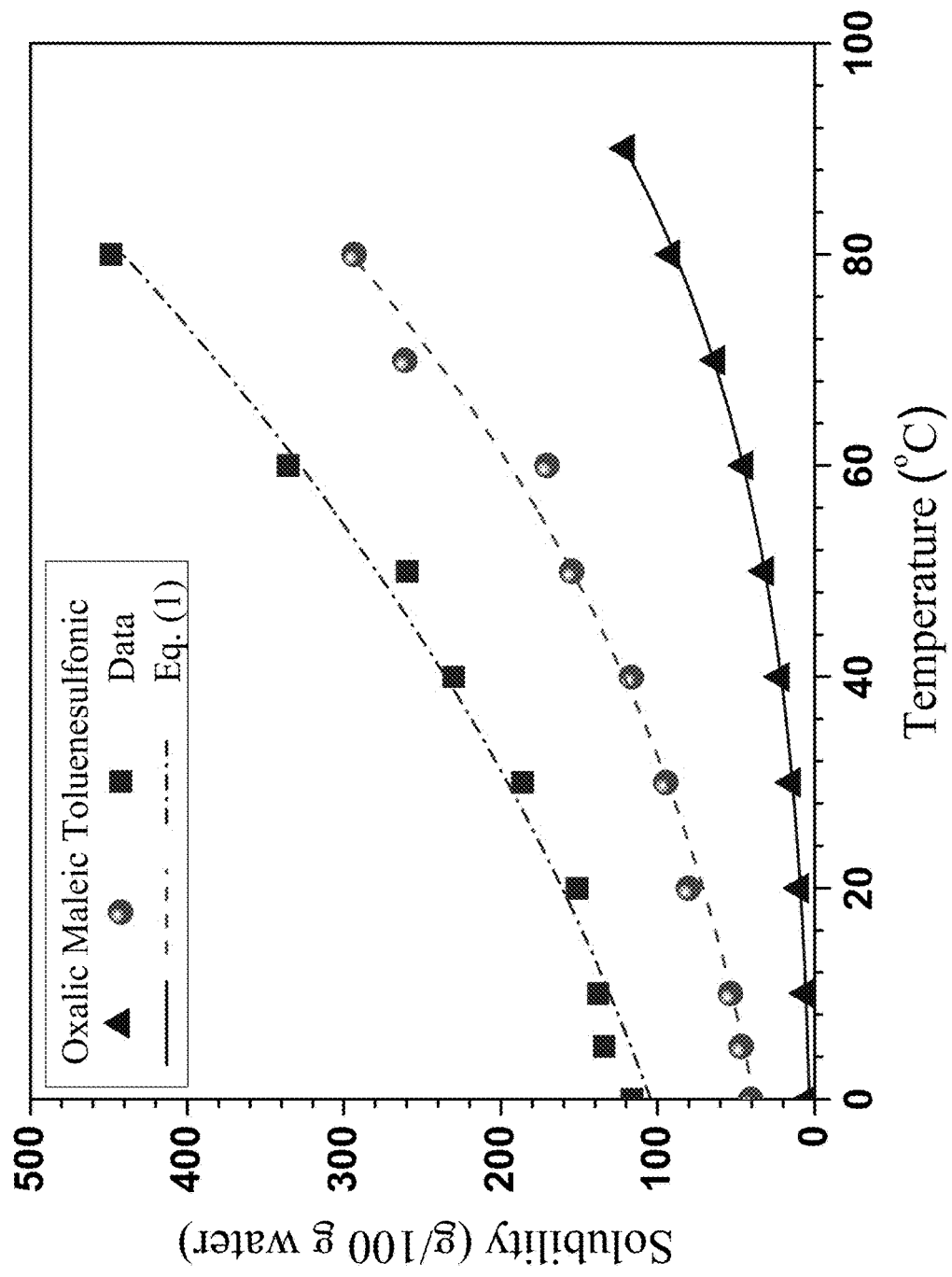
FIG. 7. Solubilities of oxalic acid, maleic acid, and toluenesulfonic acid as a function of temperature.

The solubilities of oxalic, maleic, and toluenesulfonic acids at different temperatures were determined from UV absorption measurements in saturated solutions at different temperatures. The solubilities of the three acids increased exponentially with temperature as shown in FIG. 7. The measured solubility data were fit to an exponential function as shown by Eq. (1). The maximum acid concentration that can be used at a given temperature can be determined from the exponential expression.

$$s_T = s_0 \times \exp\left(-\frac{B}{T}\right) \quad (1)$$

Where $s_0$ and B are fitting constants and listed in TABLE 1 for the three acids studied while T is in degree Kelvin.

TABLE 1

Fitting constants for predicting solubility using Eq. (1)

| Acid | $s_0$ | B | $r^2$ |
|---|---|---|---|
| Oxalic acid | $6.03 \times 10^6$ | 3,928 | 0.999 |
| Maleic acid | $3.14 \times 10^5$ | 2,461 | 0.984 |
| Toluenesulfonic acid | $6.03 \times 10^4$ | 1,737 | 0.986 |

Determination of Acid Recovery from Aqueous Acid Solutions

Figure 8:
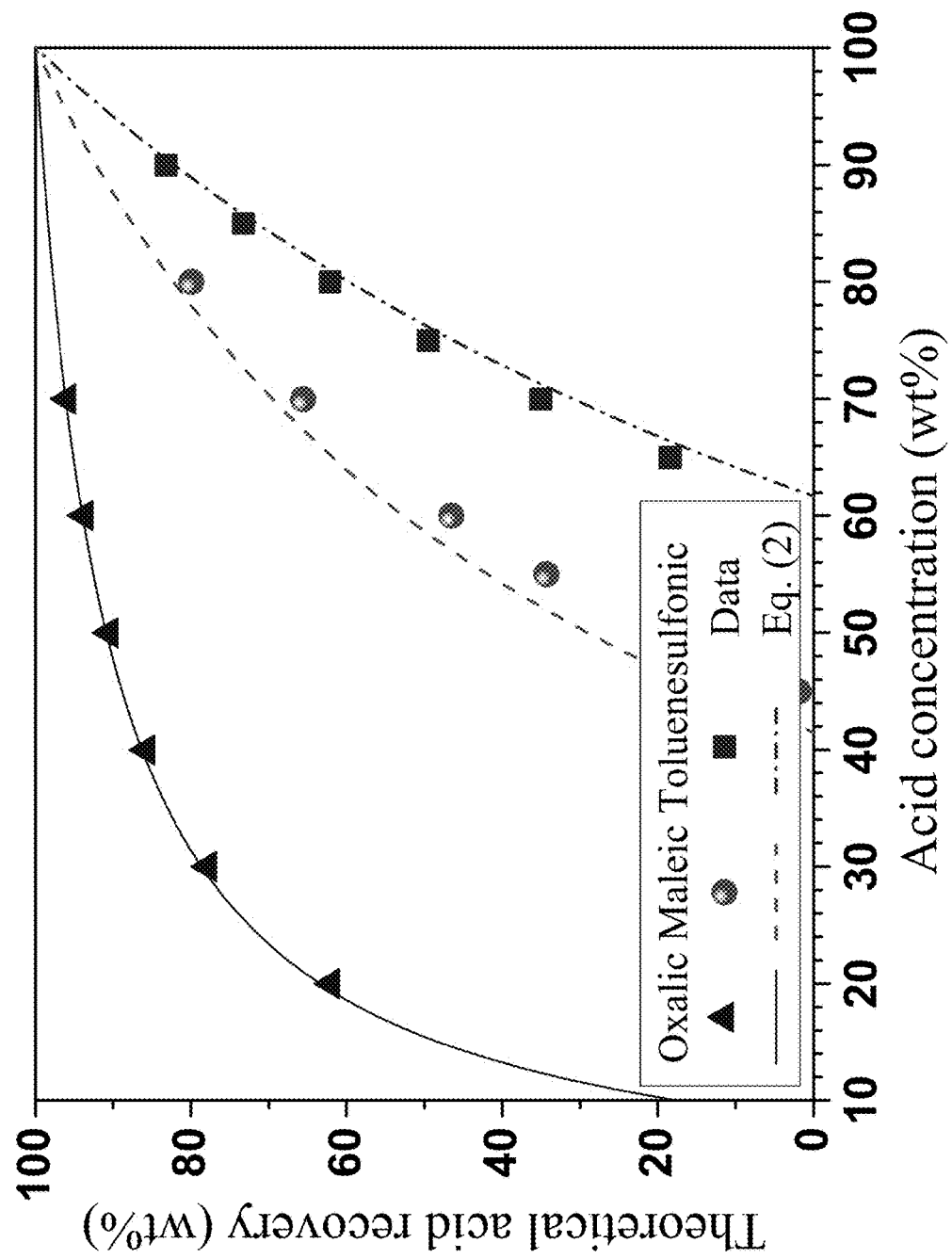
FIG. 8. Graph of the theoretical acid recovery of oxalic acid, maleic acid, and toluenesulfonic acid from an aqueous acid solution as a function of acid concentration.

From the solubility data, the amount of recoverable acid in an aqueous solution through crystallization at a reduced temperature T compared with the hydrolysis temperature can be estimated. The amount of acid that can be recovered through crystallization and precipitation is simply the amount of acid in a solution minus the maximal amount of soluble acid at the crystallization T determined by the solubility limit $s_T$. Mathematically, the theoretical acid recovery can be determined using the following expression, $$R(\%) = \frac{100C - (100 - C)s_T}{c} = \quad (2)$$
$$100 - \frac{100 - C}{c} s_T = 100 - s_0 \frac{100 - C}{c} \exp\left(-\frac{B}{T}\right)$$

Where C is the soluble acid concentration in wt. % of the acid solution, $s_T$ is the solubility of the acid in g/100 g water at T (in K) from Eq. (1). As an example, acid crystallization was assumed to be conducted at T=20° C.=293 K (ambient temperature), then the acid recoveries for the three acids at different concentrations can be obtained according to Eq. (2). As shown in FIG. 8, approximately 95% of the oxalic acid in a solution of concentration 70 wt. % can be recovered. Approximately 80% of the maleic and toluenesulfonic acid can be recovered from solution of concentration at 80 and 90 wt. %, respectively. The data points in FIG. 8 were calculated using the measured acid solubilities at 20° C. (293K) shown in FIG. 7. It should be pointed out that the recovery calculated from Eq (2) is lower than actual recovery due to water absorption in crystallization to form acid-hydrate. In most cases, the amount of water left was negligible, i.e., the amount of soluble acid was negligible. Furthermore, evaporation can always be adopted to increase acid recovery.

Determination of Acid Recovery from Acid Treatment Hydrolysate

The near complete acid recovery from hydrolysate was experimentally verified using oxalic acid hydrolysates. An aliquot of hot hydrolysate were sampled from each of the 6 oxalic acid hydrolysis runs before cooling down. After crystallization at 20° C., the measurable liquid volume of the hydrolysates was near zero. The impurity in the hydrolysate promoted crystallization. Furthermore, water was absorbed to acid crystals to form acid-hydrate that substantially reduced the solution volume. Therefore, it can be assumed there is no soluble acid and is thus 100% crystallized. The amount of acid recovery was determined using the amount of acid remaining in the hot hydrolysate since hydrolysis reactions consumed a small amount of acid. The sampled hot hydrolysates were directly analyzed before crystallization using UV absorption as previously described. As listed in TABLE 2, the amounts of oxalic acid remaining or which can be recovered through crystallization were approximately 95% for all 6 experiments under different acid concentrations.

TABLE 2

Recovery of oxalic acid from hydrolysates of BEP

| | Hydrolysis condition [1] | | | | | |
|---|---|---|---|---|---|---|
| | (O50, 100, 45) | (O50, 100, 60) | (O60, 100, 45) | (O50, 100, 90) | (O70, 100, 45) | (O70, 100, 60) |
| Hydrolysate (%) | 96.0 ± 1.3 | 95.9 ± 0.1 | 96.3 ± 0.8 | 95.9 ± 0.5 | 95.4 ± 0.3 | 94.5 ± 0.2 |
| Calculated using Eq. (2) | 90.9 | 90.9 | 93.9 | 93.9 | 96.1 | 96.1 |

[1] The hydrolysis condition is abbreviated as (acid in wt. %, T in ° C., t in min).

CNC and CNF Production from Bleached Eucalyptus Pulp—Yield

The simultaneous productions of CNC and CNF were conducted according to FIG. 1. Oxalic, maleic, toluenesulfonic, and benezenesulfonic acids at a concentration range between 30-80 wt. % were used to hydrolyze a bleached eucalyptus pulp (BEP) at 80-120° C. for 15-240 min. To determine the acid solution to BEP solid ratio the densities of acid solutions at 100° C. were experimentally determined (FIG. 2). The density variation with temperature was negligible. An appropriate amount of anhydrous acid and deionized (DI) water were used to make 80 mL acid solution at a desired concentration. The acid solution was heated in a multiple-neck flask to a desired temperature with continuous stirring to solubilize the acid. BEP fibers of 10 g in oven dry (OD) weight were added into the acid solution with continuous stirring. At the end of the desired reaction time, an aliquot of the acid hydrolysate was taken for acid recovery analysis. The reaction was then terminated by adding 160 mL of 80° C. DI-water to avoid crystallization. The resultant suspension was quickly filtered using filter paper under vacuum. The solids (CNC and CSR) were separated from the organic acid solution filtrate which was then crystallized for reuse. The filtered solids were diluted with water for washing and then centrifuged at 2000 G (higher centrifuge speed can be used to improve separation) for 10 min. The supernatant (filtrate) was decanted off, fresh water added to the solids and mixed. This washing and centrifuging procedure was repeated until the supernatant was turbid, indicating that CNCs were being dispersed into solution. The turbid supernatant and settled solids (CSR) were then mixed together and this slurry was dialyzed using DI-water until the conductivity of the liquid approached that of DI-water, indicating complete acid removal. The CNC dispersion was finally obtained by centrifuging the dialyzed sample at 2000 G for 10 min to separate CSR from CNC which stayed in the water phase. The amount of CNC in the dispersion was measured using a COD method described previously to determine yield. (See, Wang Q, Zhao X, Zhu J Y. 2014. Kinetics of strong acid hydrolysis of a bleached kraft pulp for producing cellulose nanocrystals (CNCs). Ind. Eng Chem. Res. 53(27):11007-11014 and Wang Q Q, Zhu N Y, Reiner R S, Verrill S P, Baxa U, McNeil S E. 2012b. Approaching zero cellulose loss in cellulose nanocrystal (CNC) production: recovery and characterization of cellulosic solid residues (CSR) and CNC. Cellulose 19(6):2033-2047.)

The soluble sugar in the hydrolysate can be recovered after the removal of the crystallized acid and then neutralizing the remaining spent liquor. Technologies in the art for improving the separation of acid hydrolyzed cellulosic solids from acid solution with minimum water use and evaporation can be employed to improve acid recovery through crystallization. The sugar yields under various acid hydrolysis conditions were measured as shown in TABLE 3.

The precipitated fibers, called cellulosic solid residues (CSR), were quantified using the gravimetric methods for yield determination. The CSR was then mechanically fibrillated at 1 wt. % concentration in water using a microfluidizer (Microfluidizer M-110EH, Microfluidics Corp., Westwood, Mass.) to produce CNF. The fiber suspension was first passed through a 200 μm chamber for 5 cycles at 5 MPa, and then up to an additional 5 cycles through an 87 μm chamber at 130 MPa, respectively.

Depending on needs, the reaction condition can be tailored to produce desired amounts of CNC and CNF, or a desired ratio of CNC and CNF along with desired properties of CNC and CNF. Mild acid hydrolysis conditions can be used for CNF production with near zero CNC yield and separation of CNC is not needed.

Different experiments were conducted using different acids under different conditions for the simultaneous production of CNC and CNF as listed in TABLE 3. Oxalic and maleic acids are weak acids and even at very high concentrations and long reaction times, a substantial amount of BEP fibers remained intact as CSR. In this example, maximal CNC yield of only approximately 25% was achieved with an oxalic acid solution of 70 wt. % (above the solubility limit, achieved by raising solution temperature and then cool down) at 100° C. for 60 min. Skilled artisan can improve the yield through optimization as demonstrated in the art using sulfuric acid. (See, Tailoring the yield and characteristics of wood cellulose nanocrystals (CNC) using concentrated acid hydrolysis. L Chen, Q Wang, K Hirth, C Baez, U P Agarwal, J Y Zhu (2015) Cellulose 22 (3):1753-1762; and Wang Q, Zhao X, Zhu J Y, 2014. Kinetics of strong acid hydrolysis of a bleached kraft pulp for producing cellulose nanocrystals (CNCs). Ind. Eng. Chem. Res. 53(27):11007-11014.

The trial run using toluenesulfonic acid was certainly not optimized. The acid concentration was too low and temperature was too high.

TABLE 3

Solid, CNCs yields and reduced sugar recovery (all in wt %) from organic acid treatment of BEP

| Acid [1] | Concentration (%) | Temperature (° C.) | Time (min) | CSR yield (%) | CNC yield (%) | Reduced sugar recovery (%) |
|---|---|---|---|---|---|---|
| O | 30 | 80 | 240 | 97.2 ± 0.4 | ND | 1.5 |
|  | 50 | 90 | 60 | 98.3 ± 0.7 | ND | 1.2 |
|  |  |  | 90 | 97.9 ± 0.2 | ND | 1.6 |
|  |  |  | 120 | 95.5 ± 0.2 | ND | 2.2 |
|  |  |  | 150 | 92.1 ± 0.4 | 1.4 ± 0.2 | 3.2 |
|  |  |  | 180 | 92.7 ± 0.5 | 2.3 ± 0.0 | 4.8 |
|  |  | 100 | 30 | 93.2 ± 0.1 | 4.5 ± 0.1 | 7.2 |
|  |  |  | 45 | 91.4 ± 0.2 | 8.3 ± 0.0 | 7.2 |
|  |  |  | 60 | 91.5 ± 0.4 | 8.1 ± 0.1 | 9.2 |
|  |  |  | 90 | 88.5 ± 0.5 | 11.0 ± 0.1 | 10.3 |
|  |  |  | 120 | 85.8 ± 0.1 | 12.4 ± 0.2 | 11 |
|  |  |  | 150 | 82.6 ± 0.1 | 13.9 ± 0.0 | 12.3 |
|  |  |  | 180 | 78.5 ± 0.2 | 13.5 ± 0.3 | 12.7 |
|  |  |  | 240 | 75.1 ± 0.1 | 15.8 ± 0.2 | 13.9 |
|  |  | 120 | 45 | 86.7 ± 0.3 | 12 ± 0.0 | 8.5 |
|  | 60 | 100 | 45 | 89.1 ± 0.3 | 9.0 ± 0.2 | 10.3 |
|  |  |  | 90 | 87.3 ± 0.5 | 11.0 ± 0.3 | 12.5 |
|  |  | 110 | 45 | 83 ± 0.2 | 13.7 ± 0.0 | 10.8 |
|  |  | 120 | 45 | 76.7 ± 0.5 | 11.2 ± 0.0 | 13.7 |
|  | 70 | 100 | 45 | 80.8 ± 0.7 | 11.4 ± 0.2 | 14.9 |
|  |  |  | 60 | 73.5 ± 0.3 | 24.7 ± 0.2 | 16.3 |
|  |  | 110 | 45 | 71 ± 0.2 | 17.3 ± 0.0 | 14.1 |
|  |  | 120 | 15 | 73.5 ± 0.3 | 12 ± 0.0 | 13.4 |
| M | 50 | 100 | 45 | 95.9 ± 0.3 | 1.1 ± 0.0 | ND |
|  | 60 | 100 | 45 | 95.3 ± 2.3 | 3.9 ± 0.0 | ND |
|  |  | 110 | 45 | 85.6 ± 0.7 | 8.8 ± 0.0 | ND |
|  | 70 | 100 | 45 | 83.9 ± 0.4 | 12.0 ± 0.0 | ND |
|  |  |  | 180 | 80.1 ± 0.2 | 12.7 ± 0.1 | ND |
|  | 80 | 100 | 45 | 92.6 ± 0.9 | 8.7 ± 0.0 | ND |
|  |  | 120 | 45 | 85.2 ± 0.5 | 10.3 ± 0.0 | ND |
| T | 50 | 100 | 45 | 86.6 ± 0.2 | 6.4 ± 0.0 | ND |

[1] O, M, T, and B stand for oxalic, maleic, toluenesulfonic, and benzenesulfonic acids, respectively.

CNC and CNF Morphology

To facilitate discussion, the CNC and CNF samples will be labeled using abbreviated hydrolysis conditions as (Axx, xx, xx) to represent acid (A=O as oxalic; =M as maleic; =T as toluenesulfonic; =B as benzenesulfonic acid) loading in wt. %, reaction temperature in ° C. and duration in min. TEM images of selected CNC samples using oxalic and maleic acid are presented in FIGS. 9A, 9B, and 9C and in 10A, 10B, and 10C, respectively. In general, excellent CNC was produced based on the TEM images shown. The CNC particles can be as long as over 400 nm which is longer than conventional sulfuric acid produced CNC. (See, Tailoring the yield and characteristics of wood cellulose nanocrystals (CNC) using concentrated acid hydrolysis. L Chen, Q Wang, K Hirth, C Baez, U P Agarwal, J Y Zhu (2015) Cellulose 22 (3): 1753-1762.)

Long CNC is desirable for composite reinforcement. The diameters of the CNC were approximately 10 nm. High acid loading improved fibril separation with more uniform CNC particle diameters.

CNF samples were produced through mechanical fibrillation of the acid hydrolysis CSR using microfluidization. TEM images of selected CNF samples are show in FIGS. 11A, 11B, 11C, 11D, 11E, and 11F. The morphology of the CNFs produced from the CSR generated in 50 wt. % acid hydrolysis is an slightly entangled fibril network (FIGS. 11A and 11B). The fibril lengths are longer than 1 μm. Increasing acid concentration or reaction severity resulted in CNF with short length (FIGS. 11C-11F). The short CNF suggests that acid hydrolysis substantially facilitated mechanical fibrillation of the CSR. The microfluidization condition of 5 passes each through the 200 µm and 87 µm chambers, respectively, may have over processed the CSR to whisker like particles. According to the current definition of CNC, these whisker shaped CNF can be called CNC. In this sense, we can produce chemical (acid hydrolysis)-mechanical CNC (AHM-CNC) under severe acid hydrolysis and fibrillation conditions. The crystallinity of the AHM-CNC can be measured by a person skilled in the art. The separation of CNC from CSR may not be necessary if CNC crystallinity and surface chemical functional group differences are not an issue. The entire cellulosic solids resulting from acid hydrolysis, containing pure acid hydrolysis CNC (PAH-CNC) can be fed to mechanical fibrillation to produce a CNC mixture of PAH-CNC and AHM-CNC with no CNF. On the other hand less processing or energy may be needed to produce CNF with long length rather than AHM-CNC. Using mild acid hydrolysis, no CNC will be produced and if the resulting CSR is processed with weak mechanical fibrillation, only long CNF will be generated. By eliminating separation of CNC from CNF, water usage for washing and/or dialysis can be reduced, which improves acid recovery efficiency.

The CNF produced at the lower acid loading of 50 wt. % oxalic (FIG. 9A) had longer length than the CNF (or AHM-CNC) samples at higher acid loadings (FIGS. 11E and 11F). When the sample was well dispersed at a low concentration, the higher magnification AFM images indicate that the sample comprised many individual fibrils with small amounts of entangled network. Unlike in TEMPO oxidation, acid hydrolysis removes hemicelluloses, which facilitates production of single fibrils through fibrillation. This also suggests that a low reaction severity, i.e., lower acid or temperature along with milder mechanical fibrillation can produce longer individually separated fibrils. As shown in TABLE 3. CNC was undetectable with near 100% CSR yield under low severities hydrolysis conditions; therefore, the process ends up with producing only CNF with expected long fibril length. One can use acid hydrolysis severity factor, such as the combined hydrolysis factor (CHF) that has shown to correlate to hemicellulose removal, to correlate to CNF length for process control. (See, Zhang J, Gu F, Zhu J Y, Zalesny, R S 2015. Optimizing high titer ethanol production from a SPORL pretreated poplar without detoxification using a combined hydrolysis factor (CHF). Bioresour. Technolo. 186:2230-231; Zhou H, Zhu J Y, Luo X, Leu S-Y, Wu X, Gleisner R, Dien B S, Hector R E, Yang D, Qiu X and others. 2013. Bioconversion of beetle-killed lodgepole pine using SPORL: Process scale-up design, lignin coproduct, and high solids fermentation without detoxification. Ind Eng Chem Res 52(45):16057-16065 and Zhu W, Houtman C J, Zhu J Y, Gleisner R, Chen K F. 2012. Quantitative predictions of bioconversion of aspen by dilute acid and SPORL pretreatments using a unified combined hydrolysis factor (CHF). Process Biochemistry 47:785-791.)

When fibers other than bleached eucalyptus pulp are used, such as unbleached fibers or thermal mechanical fibers, lignocellulosic nanofibrils (LCNF) can be produced according to the present methods.

CNC and CNF Thermal Stabilities

Thermal stability of cellulose nanomaterials is desirable for a variety of applications, especially for composite produced through thermal processing such as extrusion. Traditional mineral acid produced CNC is known to have poor thermal stability. CNF produced via oxidation, such as TEMPO, also has higher thermal degradation and weight loss relative to untreated cellulose fibers. Thermogravimetric analysis (TGA) of CNC, CNF, and BEP samples were conducted using a Pyris 1 TGA (PerkinElmer, Inc., Waltham, Mass.) with temperatures from ambient to 600° C. at a heating rate of 10° C./min. Approximately 5 mg of sample were used for each test. Samples were first dried at 50° C. for 4 h prior to testing. A high purity nitrogen stream with a flowrate of 20 mL/min was continuously passed into the furnace before thermal decomposition was carried out to prevent any unwanted oxidative decomposition. The weight loss was recorded and normalized against the initial weight.

Figures 12A, 12B:
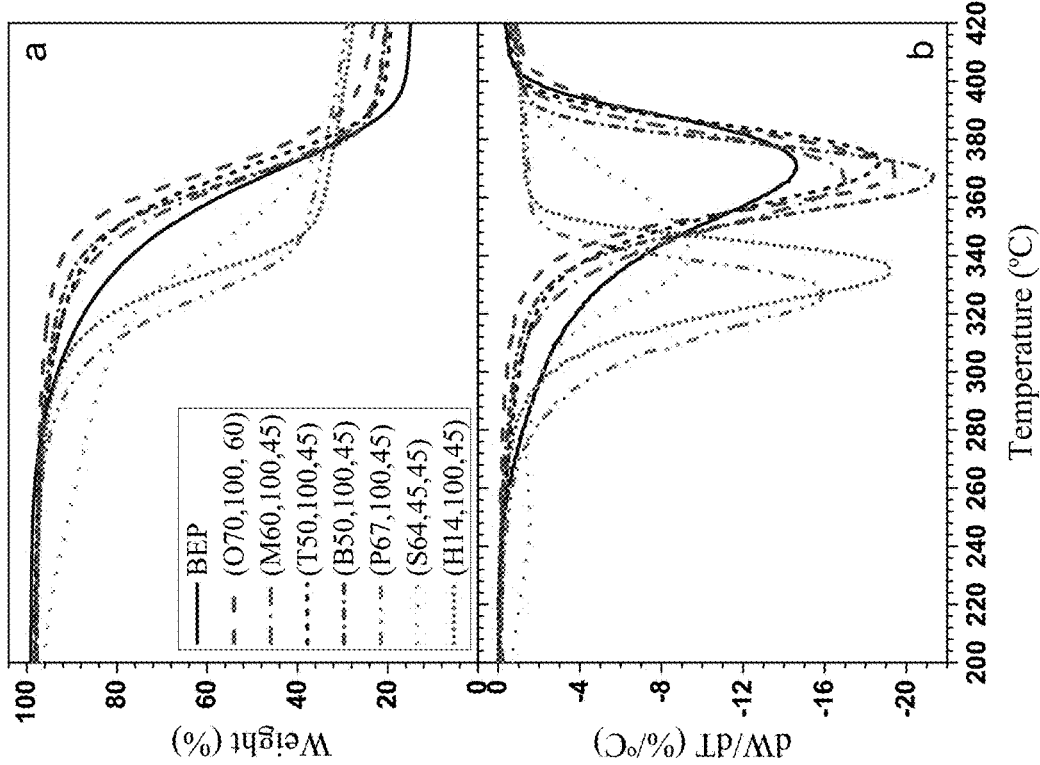
FIG. 12A. Thermogravimetric analysis (TGA) weight loss data for CNC samples produced via acid hydrolysis with various solid organic acids and inorganic acids.
FIG. 12B. TGA derivative weight loss data for the CNC samples produced via acid hydrolysis with various solid organic acids, FIG. 13A. Thermogravimetric analysis (TGA) weight loss data for CNC samples produced via acid hydrolysis with oxalic acid and various inorganic acids.

The TGA results of four CNC samples produced using oxalic, maleic, toluenesulfonic, and benezenesulfonic acids at (O70, 100, 60), (M60, 100, 45), (T50, 100, 45), (B50, 100, 45), respectively, were compared with the untreated BEP fibers, and CNC samples produced using mineral acids, i.e., sulfuric acid (S64, 45, 45), phosphoric acid (P67, 100, 45) and hydrochloric acid (H14, 100, 45). These conditions were considered standard for CNC production using mineral acids. (See, Araki J, Wada M, Kuga S, Okano T. 1998. Flow properties of microcrystalline cellulose suspension prepared by acid treatment of native cellulose. Colloids and Surfaces A: Physicochemical and Engineering Aspects 142:75-82; Camarero Espinosa S, Kulmnt T, Foster E J, Weder C. 2013. Isolation of thermally stable cellulose nanocrystals by phosphoric acid hydrolysis. Biomacromolecules 14(4):1223-1230; Chen L, Wang Q, Hirth K, Baez C, Agarwal U P, Zhu J Y. 2015. Tailoring the yield and characteristics of wood cellulose nanocrystals (CNC) using concentrated acid hydrolysis. Cellulose 22:1753-1762; Hamad W Y, Hu T Q. 2010. Structure-process-yield interrelations in nanocrystalline cellulose extraction. The Canadian J. Chemical Engineering 88:392-402 and Yu H, Qin Z, Liang B, Liu N, Zhou Z, Chen L. 2013. Facile extraction of thermally stable cellulose nanocrystals with a high yield of 93% through hydrochloric acid hydrolysis under hydrothermal conditions. Journal of Materials Chemistry A 1(12):3938-3944.) The results clearly show (FIGS. 12A and 12B) that the CNC samples produced using the four organic acids had substantially higher thermal stability than those produced using mineral acids. The onset thermal degradation temperature can be defined when $dW/dT=-1$, i.e. for every degree increase in temperature the weight loss equals 1%. Then the CNC (O70, 100, 60) had the highest onset thermal degradation temperature of approximately 322° C., compared with 274° C. for untreated BEP fibers, and 218° C. for (S64, 45, 45). The onset degradation $T_{onset}$ of (O70, 100, 60) is at least 100° C. higher than that of (S64, 45, 45). TABLE 4 lists the onset degradation temperatures of all the CNC samples produced along with the weight loss at the onset temperature. The degradation temperature $T_{95}$ at 5% weight loss for all the samples were also compared in TABLE 4. The comparisons clearly demonstrate the substantial thermal stability of the four organic acid produced CNC sample. This is a significant advantage of CNC for thermal processing, such as extrusion for composite applications.

Figures 13A, 13B:
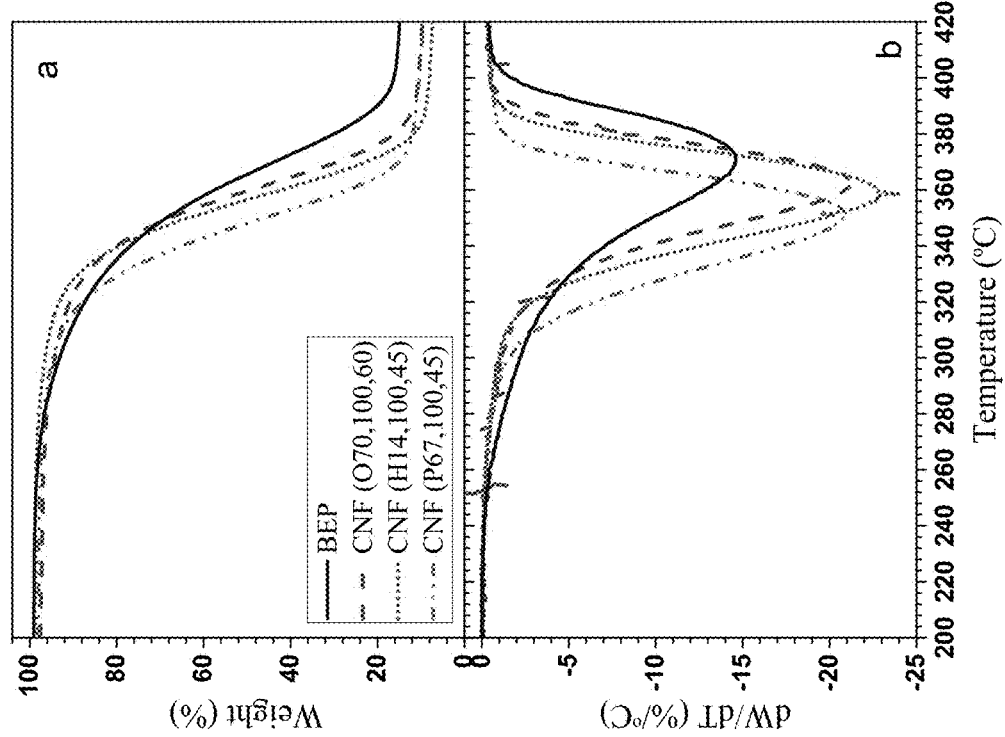
FIG. 13B. TGA derivative weight loss data for the CNC samples produced via acid hydrolysis with oxalic acid and various inorganic acids.

The improved thermal stability was also observed from a CNF sample produced using the CSR after an oxalic acid treatment at (O70, 100, 60) as shown in FIGS. 13A and 13B. It appears that the improvement in thermal stability of CNF (O70, 100, 60) was less substantial over the BEP sample than the corresponding CNC sample. However, the onset thermal degradation temperature for CNF (O70, 100, 60) was 296° C., higher than 274° C. for BEP. The improved thermal stability is mostly contributed by the improved crystallinity of CNC or CNF over BEP. It is expected that CNF is less crystalline than CNC and would therefore have less of an increase in thermal stability over BEP.

To further demonstrate the high thermal stability of CNC samples from the present invention, CNC samples from concentrated sulfuric acid hydrolysis (S64, 45, 45) and oxalic acid hydrolysis (O70, 100, 60) went through extended thermal testing in an oven at 105° C. The degradation of (S64, 45, 45) can be clearly seen from the color of the sample due to carbonization after 4 hours testing while the CNC sample (O70, 100, 60) has no color (FIG. 14A). The color change was minor for (O70, 100, 60) even after 24 h heating, while (S64, 45, 45) became completely brown color (FIG. 14B).

TABLE 4

Comparisons of onset thermal degradation temperature and temperature at 5% weight loss among different CNC samples and original BEP.

| CNC | Onset degradation $T_{onset}$ (° C.) | Weight loss at $T_{onset}$ (%) | $T_{95}$ at 5% weight loss (° C.) |
|---|---|---|---|
| (O70, 100, 60) | 322 | 4.99 | 323 |
| (M60, 100, 45) | 301 | 5.40 | 297 |
| (T50, 100, 45) | 299 | 5.20 | 297 |
| (B50, 100, 45) | 307 | 5.25 | 304 |
| BEP | 274 | 2.75 | 290 |
| (P67, 100, 45) | 268 | 3.84 | 277 |
| (S64, 45, 45) | 218 | 5.05 | 217 |
| (H14, 100, 45) | 284 | 4.65 | 287 |

CNC and CNF Surface Hydrophilicity

Figure 15:
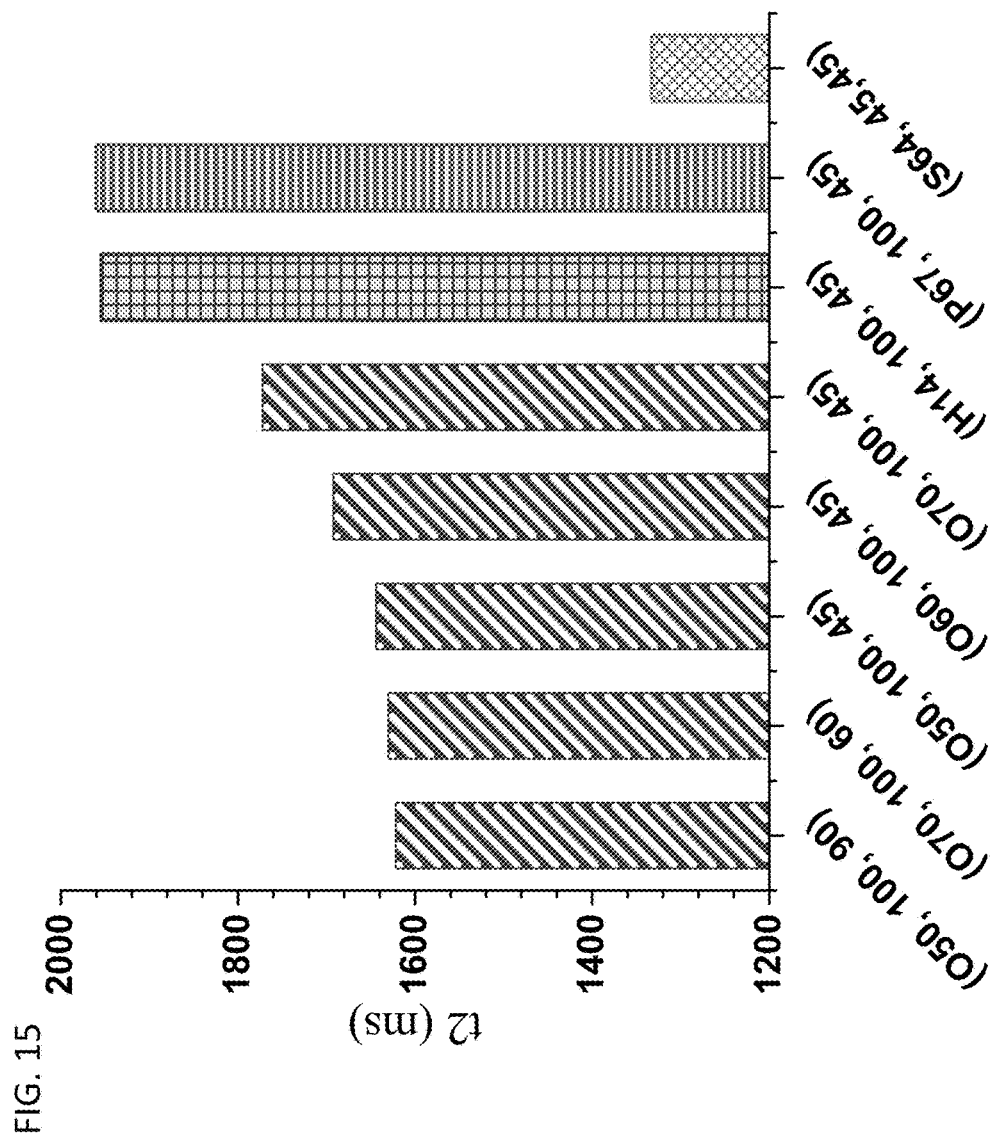
FIG. 15. NMR t2 relaxation times for CNC samples produced via acid hydrolysis with oxalic acid and various inorganic acids.

To investigate CNC surface hydrophilicity, CNC suspensions were evaluated using low-field NMR. All samples had one peak corresponding to interaction between CNC and water. However, the relaxation time, t2, for different samples varied as shown in FIG. 15. Pure water had a t2 of approximately 2000 ms. This clearly indicates that the sulfuric acid produced CNC (S64, 45, 45) had the strongest interaction with water with very low t2 approximately 1300 ms, i.e., highly hydrophilic. The CNC from hydrochloric acid (H15, 100, 45) had very limited interaction with water having a t2 over 1900 ms; so did the phosphoric acid produced CNC (P67, 100, 45). All of the oxalic acid produced CNC samples had some interactions with water and were hydrophilic but not as strong as (S64, 45, 45). This can be beneficial for many applications such as facilitating water removal and improving moisture barrier properties.

CNC and CNF Surface Charge

Figures 10A, 10B, 10C:
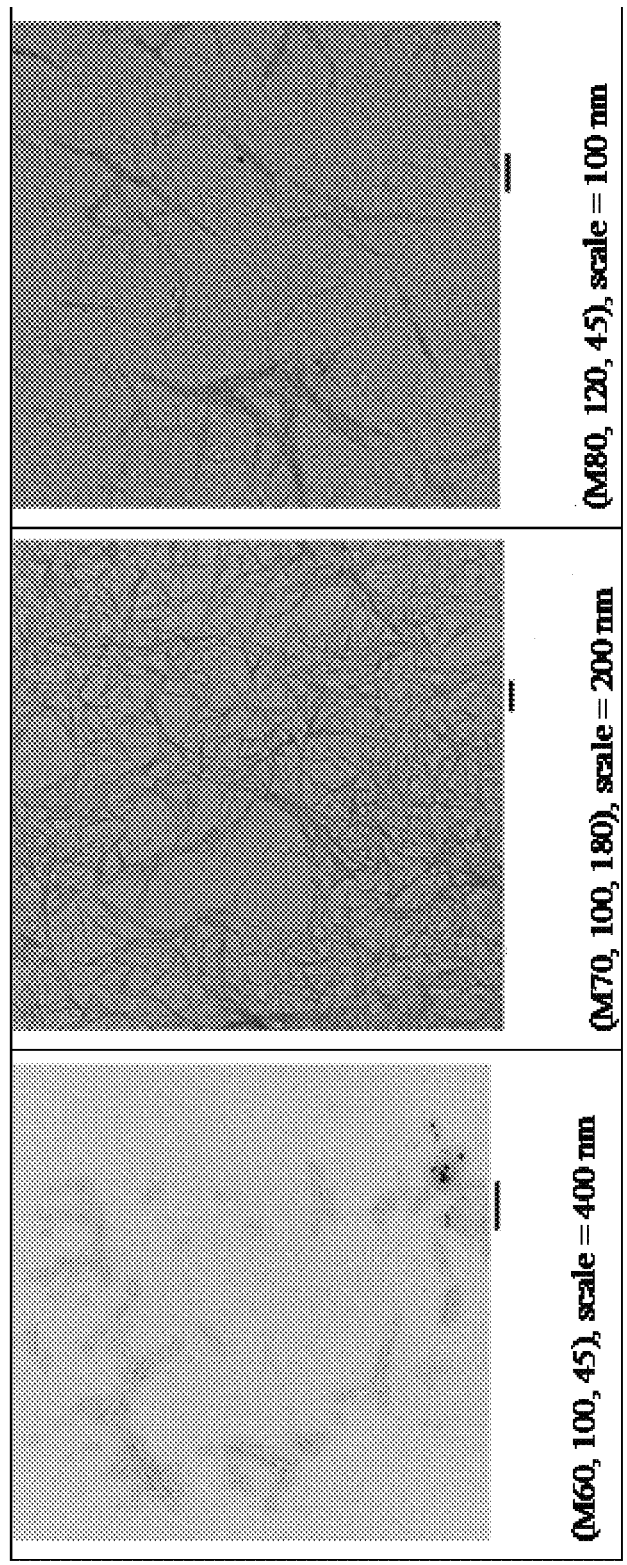
FIG. 10A. TEM image of a CNC sample produced via acid hydrolysis using maleic acid at an acid loading of 60 wt. % and 100° C. for 45 min.
FIG. 10B. TEM image of a CNC sample produced via acid hydrolysis with maleic acid with an acid loading of 70 wt. % and 100° C. for 180 min.
FIG. 10C. TEM image of a CNC sample produced via acid hydrolysis with maleic acid with an acid loading of 80 wt. % and 120° C. for 45 min.

The surface charges of CNC and CNF samples were measured using a zeta potential analyzer (Nanobrook Omni, Brookhaven Instruments, Holtsville, N.Y.). The surface charges provided good dispersion in water due to electrostatic repulsion as shown by the TEM images of the samples (FIGS. 9-11). In general, increasing acid loading in hydrolysis increased surface charge (absolute value) as shown in TABLE 5. CNC samples produced using oxalic acid were just as highly charged as the CNC produced using sulfuric acid at a standard condition (S64, 45, 45). Maleic acid, however, produced CNC with lower charge than oxalic acid produced samples under the same reaction conditions, perhaps due to its weak acidity. However, the charge was still higher than CNC produced using phosphoric and hydrochloric acids. The surface charges of CNF samples produced using oxalic acid are lower than their corresponding CNC samples, but higher than the CNC samples produced using phosphoric and hydrochloric acids, so they should have good dispersion as well. Catalysis can be used to enhance esterification between the double carboxylic acid and cellulose to result in improved carboxylation and, therefore, surface charge.

TABLE 5

NMR relaxation time t2, surface charge, carboxyl group content, and crystallinity index CrI of the CNC samples.

| CNC Sample | NMR relaxation time t2 (ms) | CNC Charge (mV) | COOH (mmol/g CNC) | CrI (%) |
|---|---|---|---|---|
| BEP | | | ND | 76.0 ± 0.4 |
| (O50, 100, 45) | | −52.66 ± 0.64 | 0.11 | 82.8 |
| (O60, 100, 45) | 1692 | −57.68 ± 0.40 | 0.15 | 82.4 |
| (O70, 100, 45) | 1772 | −65.92 ± 0.49 | 0.19 | 81.2 |
| (O50, 100, 90) | 1622 | −44.38 ± 0.37 | 0.17 | 81.3 |
| (O60, 100, 90) | | −44.40 ± 0.81 | 0.39 | 80.0 |
| (O70, 100, 60) | 1630 | −45.85 ± 0.81 | 0.23 | 80.4 |
| (M50, 100, 45) | | −38.62 ± 0.65 | | |
| (M60, 100, 45) | | −33.68 ± 0.76 | | |
| (M70, 100, 45) | | −44.02 ± 0.87 | | |
| (T50, 100, 45) | | −22.86 ± 0.34 | | 82.4 |
| (S64, 45, 45) | 1333 | −55.98 ± 0.61 | | 77.9 ± 0.2 |
| (P67, 100, 45) | 1960 | −24.39 ± 0.88 | | |
| (H14, 100, 45) | 1954 | −24.32 ± 0.35 | | |

CNC and CNF Chemical Structures: Esterification and Carboxylation

Figure 16:
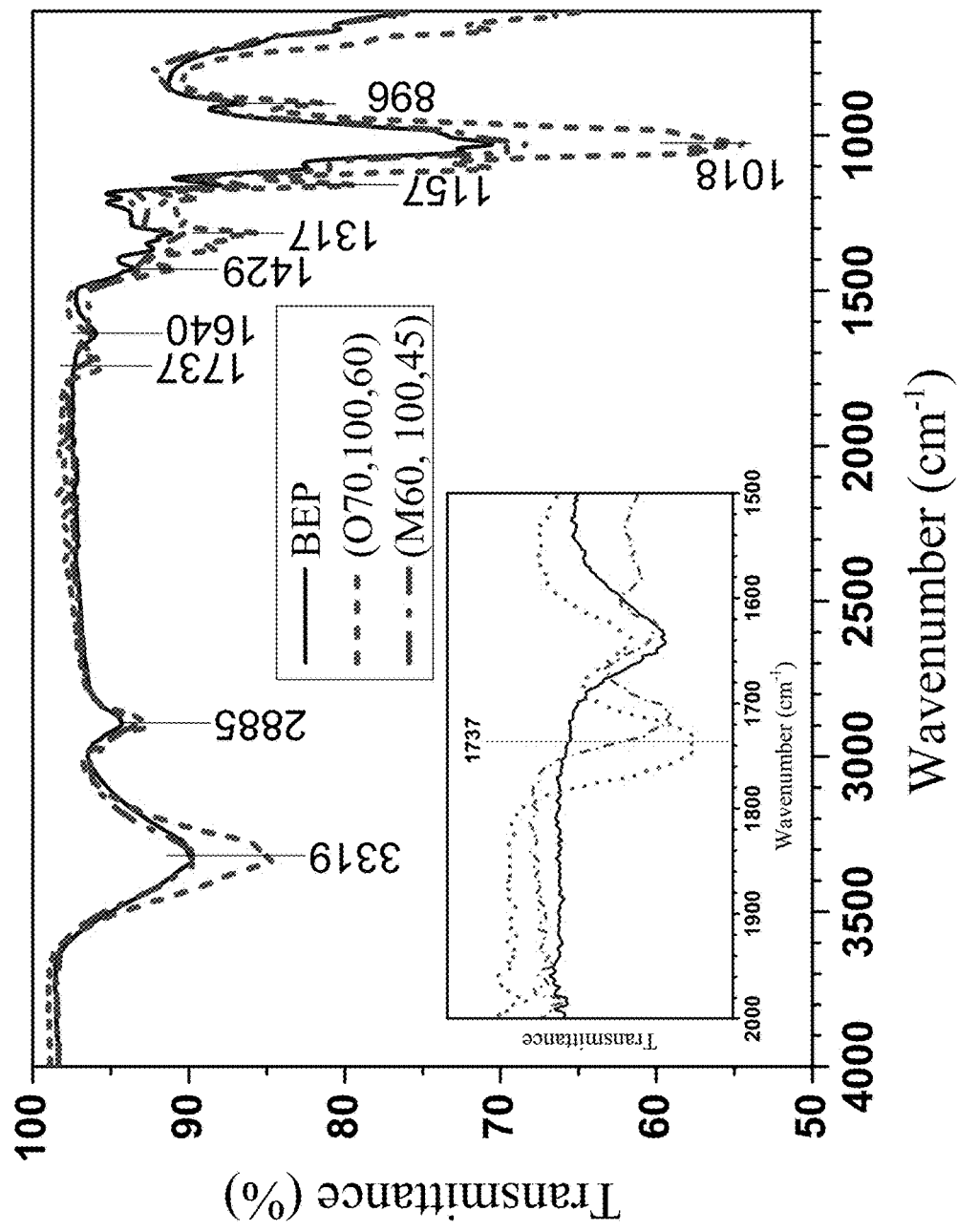
FIG. 16. Fourier transform infrared (FT-IR) absorption spectra for CNC samples produced via acid hydrolysis with oxalic acid and maleic acid.
Figure 17:
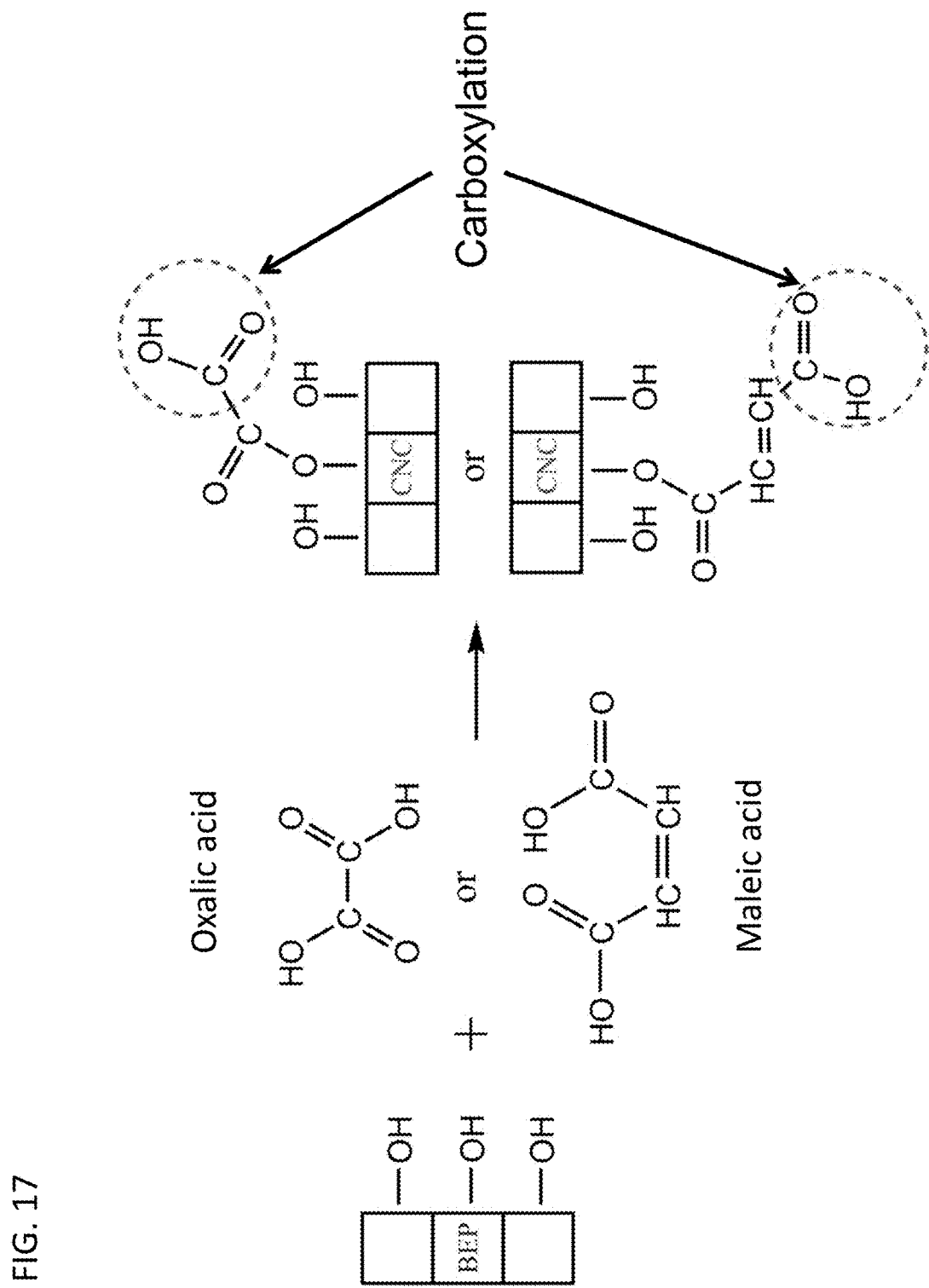
FIG. 17. A schematic diagram showing cellulose esterification and carboxylation using concentrated dicarboxylic acid hydrolysis.

Fourier transform infrared (FT-IR) absorption of two CNC samples, (O70, 100, 45) and (M60, 100, 45) along with the original BEP were analyzed using a FT-IR spectrophotometer (Spectrum 100, PerkinElmer, Waltham, Mass.) equipped with a universal attenuated-total-reflection (ATR) probe. As shown in FIG. 16, several absorption peaks were observed. The identifications of these peaks are listed in TABLE 6. The main feature of the two CNC samples is esterification as observed from the ester carbonyl groups (C=O) at 1737 cm$^{-1}$ that does not appear from the untreated BEP sample (see the insert plot in FIG. 16 for detail). This suggests that one of the carboxyl acid groups in oxalic and maleic acids reacted with cellulose (most likely at C6 position) to become esterified. Because each molecule of oxalic or maleic acid has two carboxyl groups, this leaves another open carboxyl group on the esterified cellulose, i.e., CNC, also CSR or CNF are also carboxylated as schematically shown in FIG. 17. This marks a key difference between the present invention and those reported in the literature using single carboxylic acid such as acetic acid for cellulose nanomaterial production (Braun B, Dorgan J R. 2009. Single-step method for the isolation and surface functionalization of cellulosic nanowhiskers. Biomacromolecules 10(2):334-341). Cellulose esterification did occur using a mono-carboxylic acid, as in the acetic acid hydrolysis conducted by Braun and Dorgan, based on FTIR studies, however, the resultant cellulose nanomaterials were not carboxylated because no carboxyl group was left after cellulose esterification by acetic acid.

TABLE 6

Identifications of FT-IR absorption peaks

| Peak wavenumber (cm$^{-1}$) | Identification |
|---|---|
| 3319 | OH hydroxyl group stretching |
| 2885 | C—H vibration |
| 1737 | C=O ester carbonyl group |
| 1640 | $H_2O$ (moisture) in cellulose |
| 1018, 1157 | C—O stretching |
| 896 | β-glycosidic linkages |

Conductmetric titration of the CNC samples was conducted using a zeta potential analyzer (Nanobrook Omni, Brookhaven Instruments, Holtsville, N.Y.) to determine the carboxyl group content. The results indicate carboxyl group content ranged from 0.11-0.39 mmol/g CNC for the 6 CNC samples produced using oxalic acid (TABLE 5). This again proves that the CNC produced are also carboxylated as well as esterified, important to functionalization.

Enhancement of Esterification Using a Strong Acid as a Catalyst

Acid, especially strong acid, can enhance esterification. p-toluenesulfonic acid or sulfuric acid was added into an oxalic acid solution at 0.2 mol/L during the acid hydrolysis to enhance the esterification, which increased the surface carboxyl group content of the hydrolyzed cellulosic materials using a double carboxylic acid. At the oxalic acid hydrolysis condition (O50, 100, 45), cellulose nanocrystals produced from the same BEP had a carboxyl group content of 0.32 (p-toluenesulfonic acid) or 0.38 (sulfuric acid) mmol/g; higher than the 0.11 mmol/g for the control study without p-toluenesulfonic acid and sulfuric acid.

Enhancement of Esterification in a Solvent System

Water free processing can facilitate esterification. An organic solvent system was studied to further enhance esterification. Acetic acid was used as a solvent to replace water during the acid reaction. The solvent system was made of 70 wt. % acetic acid and 30 wt. % oxalic acid. The solubility of oxalic acid was low in the acetic acid. Therefore, the low oxalic acid concentration of 30 wt. % was used. For hydrolysis at 100° C. for 60 min, labeled as (O30/A70, 100, 60), the carboxyl group content of the CNC produced using this solvent system was increased to 0.63 mmol/g.

Enhancement of Esterification in Organic Solvent System with Maleic Anhydride as a Catalysts and a Reactant Carboxylic acid anhydrides are excellent choices for esterification due to their greater reactivity than carboxylic acids. An organic solvent system of maleic anhydride (20 wt. %), maleic acid (40 wt. %), and acetic acid (40 wt. %) as solvent was used to react with the same BEP at 100° C. for 60 min, labeled as (M40/MAH20/A40, 100, 60). The surface carboxyl group content of the resultant CNC was increased to 1.51 mmol/g.

CNC and CNF Suspension Optical Transmittance

Figure 18:
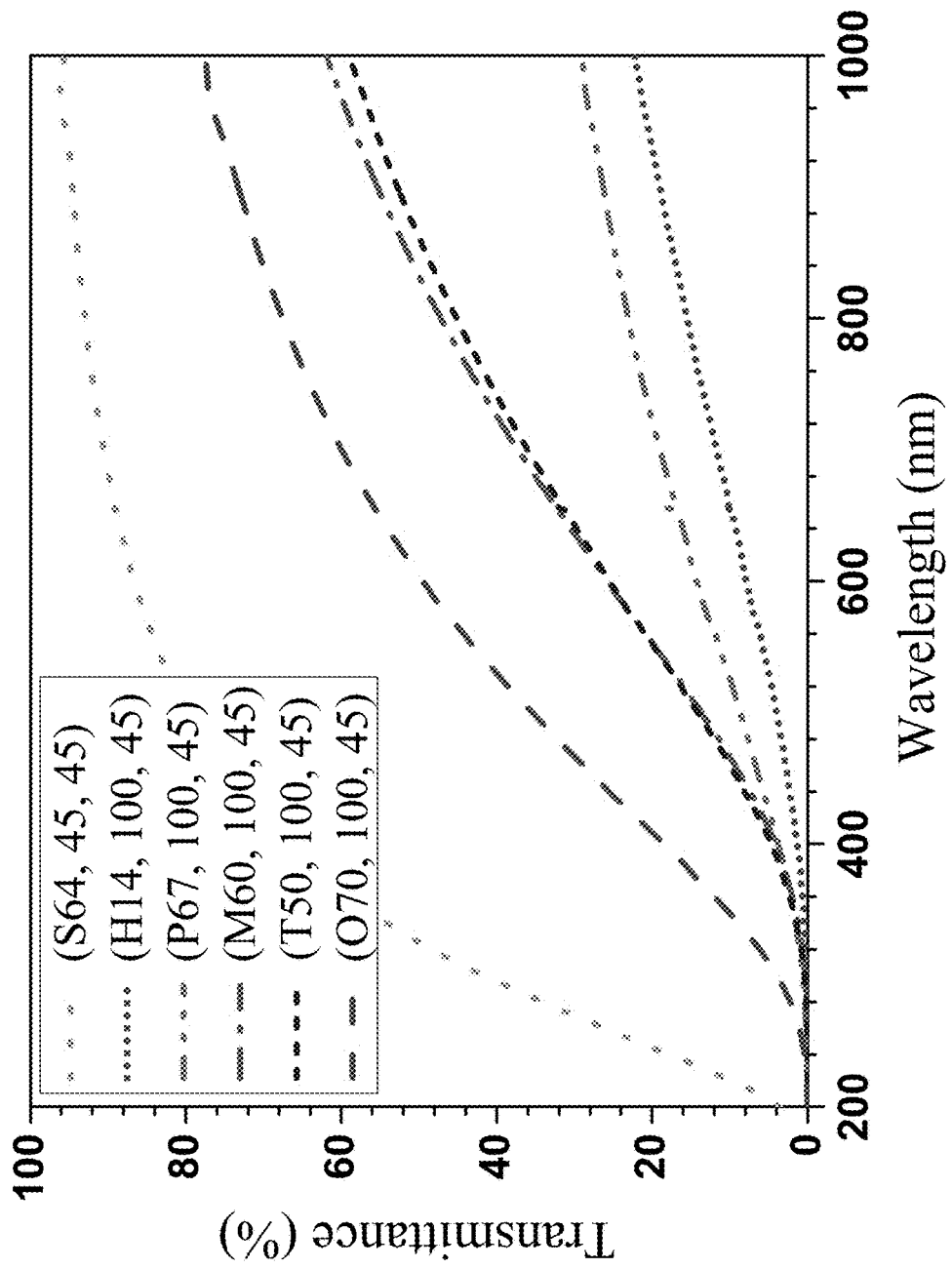
FIG. 18. Transmittance spectra for CNC samples produced via acid hydrolysis with various solid organic acids and inorganic acids.

The short dimension of cellulose nanomaterials provide them with good light transmittance for certain applications. The optical absorptions of the CNC and CNF suspensions at 1 wt. % concentration were measured using a commercial spectrophotomer (Model 8453, Agilent Technologies, Palo Alto, Calif.). The transmittances were calculated based on the measured absorbance values. The CNC samples produced using oxalic, maleic, and toluenesulfonic acids had good transmittance, especially in the longer wavelengths as shown in FIG. 18. The transmittances of these CNC samples were lower than that of the CNC from sulfuric acids (S64, 45, 45), suggesting that the overall CNC length of (S64, 45, 45) was shorter than the CNC samples produced from organic acids, in agreement with TEM imaging.

Figure 19:
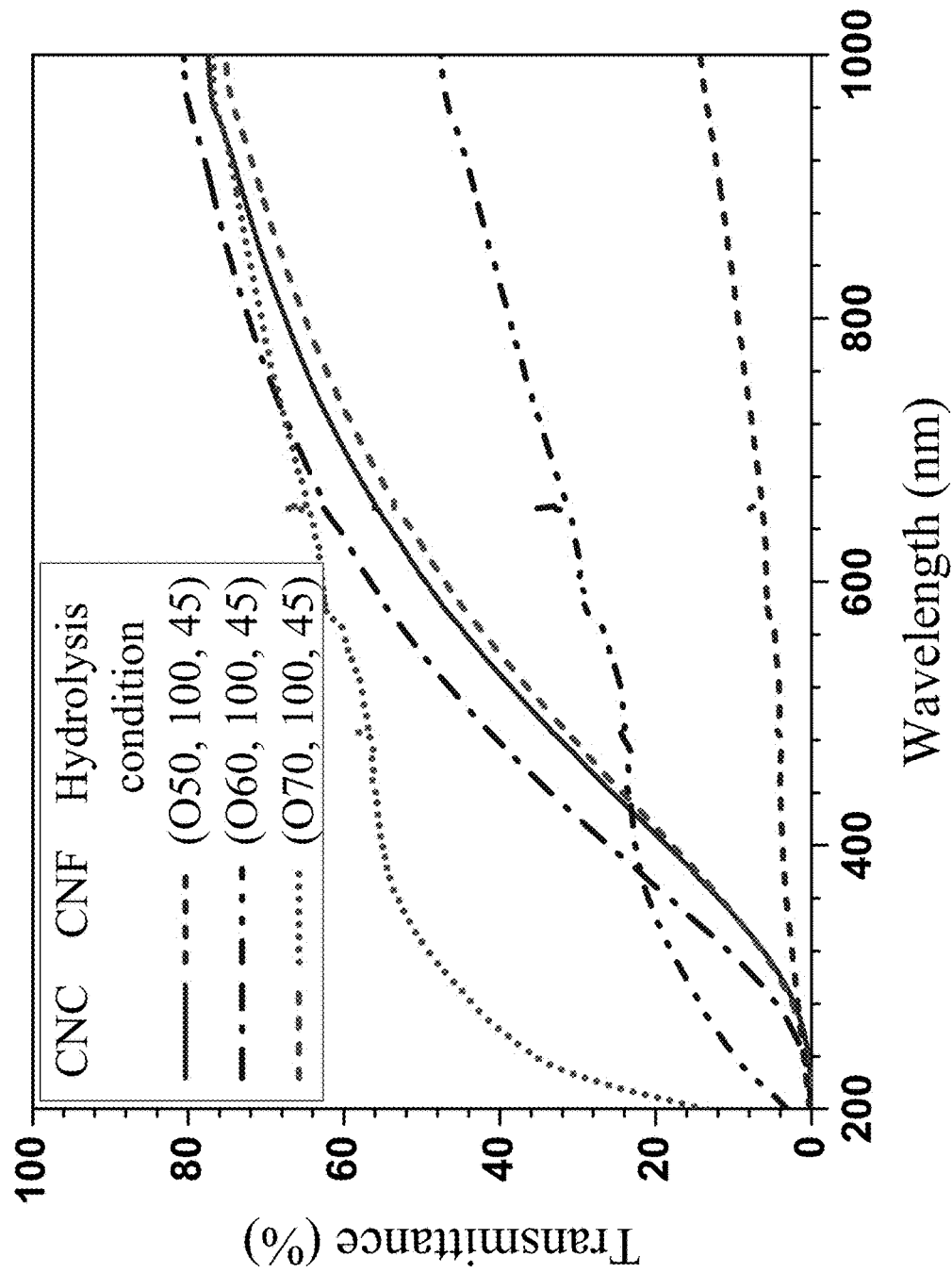
FIG. 19. Transmittance spectra for CNC and their corresponding CNF samples produced via acid hydrolysis with oxalic acid.

When comparing the optical transmittances of the CNC samples with their corresponding CNF samples produced under the same conditions using oxalic acid, the CNC samples had higher transmittance than the CNF samples as shown in FIG. 19. This suggests that the CNF samples in general had larger particle size such as longer length than their corresponding CNC samples. The TEM imaging (FIGS. 9 and 10) may only catch the well dispersed small particles which were shorter whiskers in the CNF samples. This is further supported by the fact that the difference in optical transmittance between a CNC and its corresponding CNF suspension became smaller as acid concentration increased as shown in FIG. 19; with a more severe treatment, mechanical fibrillation is better able to break the CSR into AHM-CNC.

Determination of CNC CrI

The CrI for the CNC samples were measured by wide-angle X-ray diffraction on a Bruker D8 130 Discover system with Cu-Kα radiation (Bruker Corp., Billerica, Mass.). The CrI was calculated using the Segal method (Segal, et al. Textile Research Journal 1959, 29, 786-794) without baseline subtraction according to the below formula:

$$CrI=100(I_{200}-I_{amph})/I_{200},$$

where $I_{200}$ is the scattering intensity at $2\theta=22°$ and $I_{amph}$ is the intensity at $2\theta=18°$. The results are reported in Table 5.

Determination of Nanocrystal Aspect Ratio

Figure 20:
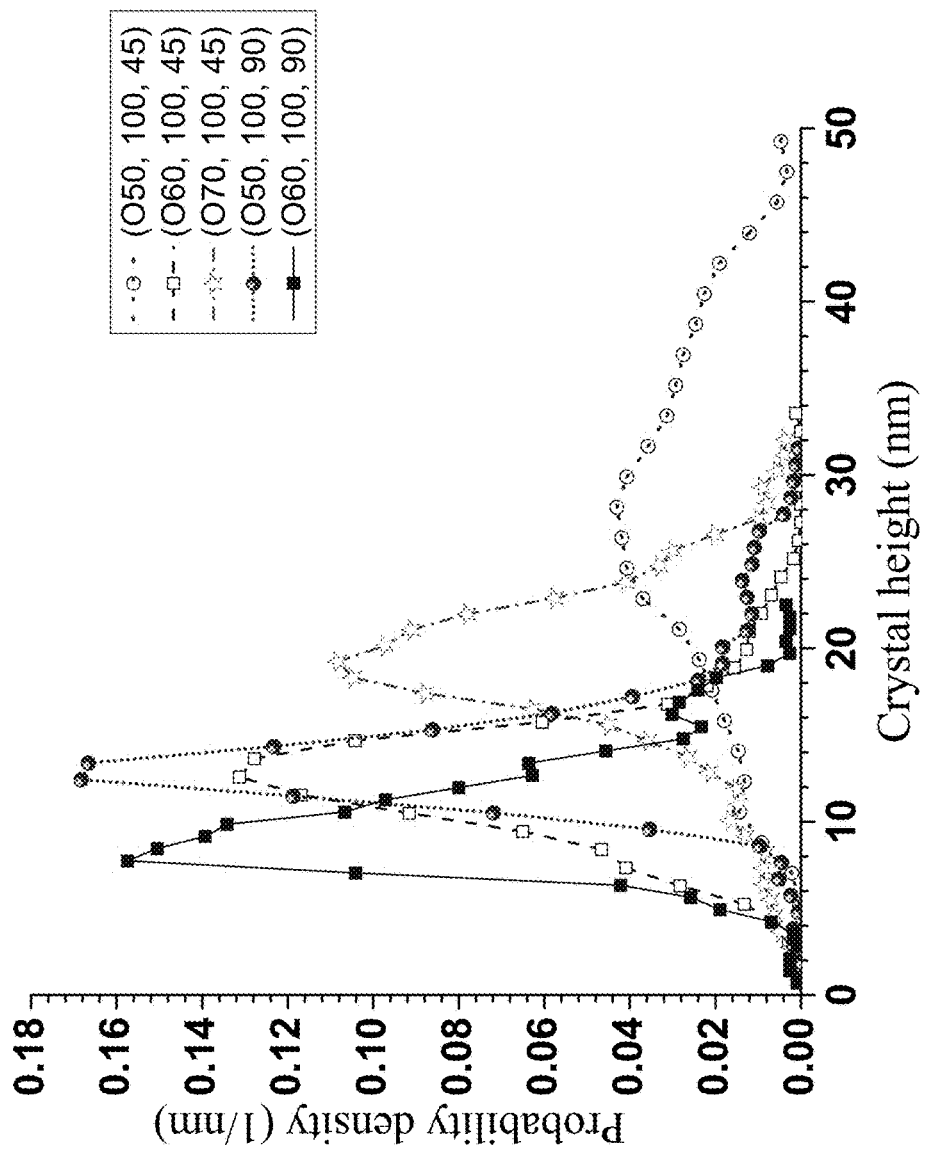
FIG. 20. Crystal height distributions for CNC samples produced via acid hydrolysis using oxalic acid.
Figure 21:
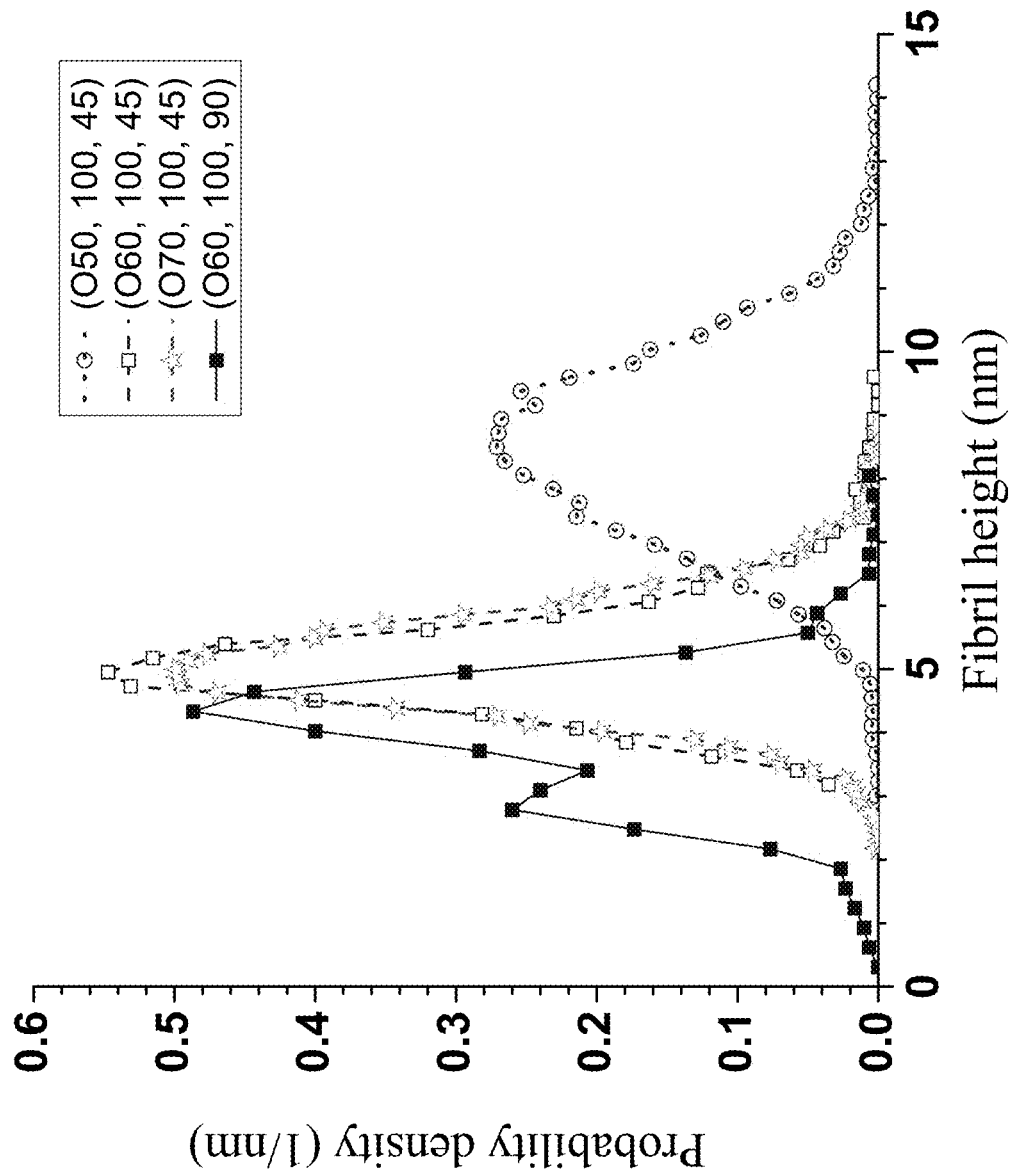
FIG. 21. Height distributions for CNF samples produced via acid hydrolysis using oxalic acid.

The average aspect ratio for the cellulose nanoparticles in a sample (e.g., cellulose nanocrystals or cellulose nanofibrils) can be determined by calculating the diameter (height) and length probability densities for the nanoparticles in the sample. The height probability density for a sample imaged via AFM was calculated from the probability of a diameter (in a diameter bin) divided by the bin size. The heights of the CNCs or CNFs were determined from automated AFM topographical measurements. These heights were treated as diameters. The height density distribution for various CNC and CNF samples are provided in FIGS. 20 and 21. The CNC or CNF length ranges were visually observed from the AFM images as shown in FIGS. 22A, 22B, 22C, and 22D (for (O50, 100, 45), (O50, 100, 90), (O60, 100, 45), and (O70, 100, 45), respectively) and 23A, 23B, and 23C (for (O50, 100, 45), (O60, 100, 45), and (O70, 100, 45), respectively). Typical CNC length is approximately 200-400 nm, while typical CNF length is approximately 1 micrometer even at high acid loading of 70 wt. % (FIG. 23C).

Production of Carboxylated Fibers with Reduced Refining Energy

Using concentrated organic acids to remove a fraction of hemicelluloses can achieve energy saving in mechanical refining of wood chips for pulp production. The acid pretreatment can be conducted at low temperatures and the acid can be recycled. More importantly, the fibers produced with higher acid loading contain both carboxyl and ester groups for functionalization.

Poplar wood (NE222) wood chips were treated using maleic acid solution with liquor to wood ratio of 5:1 (L/kg). Acid hydrolysis was conducted at (M25, 80, 45). The pretreated wood chips were first refined in a pressurized disk refiner for one pass with a disk plate gap of 4/1000 inches. This was followed by refining in a laboratory 12 inch atmospheric disk refiner (Andritz Sprout-Bauer Atmospheric Refiner, Springfield, Ohio). The same disk plate pattern of DB2-505 was used in both refiners. The refined pulp was then screened to remove shives, as is standard industry practice. The screen-accept pulp was used to for making handsheets. Mechanical refining energy savings from maleic acid treatment was approximately 30% at hemicellulose removal of approximately 25%. The mechanical properties of the sheet from treated and untreated wood were compared. Preliminary results show equivalent or slightly better mechanical strength, in terms of specific tensile and modulus, were obtained.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for the production of cellulose nanofibrils and cellulose nanocrystals from a feed cellulosic material comprising crystalline cellulosic components and disordered cellulosic components, the method comprising:
   (a) hydrolyzing or degrading disordered cellulosic components in the feed cellulosic material using an organic carboxylic acid to obtain a carboxylated cellulosic solid comprising carboxylated cellulose nanocrystals and carboxylated cellulosic solid residues, the carboxylated cellulosic solid residues comprising cellulose fibers, cellulose microfibers, or a combination thereof;
   (b) optionally, separating the carboxylated cellulose nanocrystals from the carboxylated cellulosic solid residues; and
   (c) subjecting the carboxylated cellulosic solid residues to mechanical shear forces, whereby the carboxylated cellulose nanofibrils are formed;
   wherein the carboxylated cellulose nanocrystals, carboxylated cellulosic solid residues, and carboxylated cellulose nanofibrils have a surface carboxyl group content of at least 0.02 mmol/g; and
   further wherein the carboxylated cellulose nanocrystals have an onset thermal degradation temperature that is at least 5° C. higher than the onset thermal degradation temperature of the feed cellulosic material.

2. The method of claim 1, wherein the organic carboxylic acid used in the acid hydrolysis or degradation reaction comprises a dicarboxylic acid.

3. The method of claim 2, wherein the organic carboxylic acid used in the acid hydrolysis or degradation reaction comprises maleic acid.

4. The method of claim 2, wherein the organic carboxylic acid used in the acid hydrolysis or degradation reaction comprises fumaric acid.

5. The method of claim 2, wherein the organic carboxylic acid used in the acid hydrolysis or degradation reaction comprises oxalic acid.

6. The method of claim 2, wherein the organic carboxylic acid used in the acid hydrolysis or degradation reaction comprises malonic acid.

7. The method of claim 1, wherein the cellulosic solid comprises from 0.1 to 40 wt. % carboxylated cellulose nanocrystals and from 60 to 99.9 wt. % carboxylated cellulosic solid residue, based on the solid content.

8. The method of claim 1, wherein the carboxylated cellulose nanocrystals have an onset thermal degradation temperature that is at least 10° C. higher than the onset thermal degradation temperature of the feed cellulosic material.

9. The method of claim 1, wherein the carboxylated cellulose nanocrystals have an onset thermal degradation temperature that is at least 40° C. higher than the onset thermal degradation temperature of the feed cellulosic material.

10. The method of claim 1, further comprising crystallizing and recovering the organic carboxylic acid from the acid hydrolysis.

11. The method of claim 1, wherein the organic acid loading, based on acid mass concentration, in the acid hydrolysis is at least 10 wt. %.

12. The method of claim 1, wherein the organic acid loading, based on acid mass concentration, in the acid hydrolysis is in the range from 5 wt. % to 90 wt. %.

13. The method of claim 1, wherein the disordered cellulosic components in the feed cellulosic material are hydrolyzed in the presence of a catalyst or in a solvent system that catalyzes the esterification of the cellulosic solid.

14. The method of claim 1, comprising separating the carboxylated cellulose nanocrystals from the carboxylated cellulosic solid residues.

* * * * *